(12) United States Patent
Conrad

(10) Patent No.: US 11,715,967 B2
(45) Date of Patent: *Aug. 1, 2023

(54) SURFACE CLEANING APPARATUS, AND A CHARGING UNIT THEREFOR

(71) Applicant: Omachron Intellectual Property Inc., Hampton (CA)

(72) Inventor: Wayne Ernest Conrad, Hampton (CA)

(73) Assignee: Omachron Intellectual Property Inc., Hampton (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/528,782

(22) Filed: Nov. 17, 2021

(65) Prior Publication Data

US 2022/0142431 A1     May 12, 2022

Related U.S. Application Data

(63) Continuation of application No. 16/281,788, filed on Feb. 21, 2019, now Pat. No. 11,218,017.

(51) Int. Cl.
| | |
|---|---|
| *H02J 7/34* | (2006.01) |
| *H02J 7/00* | (2006.01) |
| *H01G 11/04* | (2013.01) |
| *A47L 9/28* | (2006.01) |

(52) U.S. Cl.
CPC ............ *H02J 7/342* (2020.01); *A47L 9/2857* (2013.01); *A47L 9/2873* (2013.01); *A47L 9/2884* (2013.01); *H01G 11/04* (2013.01); *H02J 7/0044* (2013.01); *H02J 7/0048* (2020.01); *H02J 7/00714* (2020.01); *H02J 7/345* (2013.01); *H02J 2207/20* (2020.01); *H02J 2207/50* (2020.01); *H02J 2310/22* (2020.01)

(58) Field of Classification Search
CPC ....................................................... H02J 7/342
USPC ....................................................... 320/132
See application file for complete search history.

(56) References Cited

U.S. PATENT DOCUMENTS

| | | | |
|---|---|---|---|
| 6,229,280 B1 * | 5/2001 | Sakoh | H02J 7/00047 320/114 |
| 7,377,007 B2 * | 5/2008 | Best | A47L 9/009 15/329 |
| 7,863,857 B2 | 1/2011 | Becker et al. | |
| 8,138,819 B2 | 3/2012 | Kuroda | |
| 8,183,819 B2 | 5/2012 | Sugano | |
| 8,482,263 B2 | 7/2013 | Barrade et al. | |
| 8,834,209 B2 | 9/2014 | Conrad | |
| 9,775,484 B2 | 10/2017 | Conrad | |

(Continued)

FOREIGN PATENT DOCUMENTS

| | | |
|---|---|---|
| JP | 2017192237 A | 10/2017 |
| WO | 2007121533 A1 | 11/2007 |

OTHER PUBLICATIONS

International Search Report and Written Opinion, received in connection to international patent application No. PCT/CA2020/050161, dated May 7, 2020.

(Continued)

*Primary Examiner* — Yalkew Fantu
(74) *Attorney, Agent, or Firm* — Philip C. Mendes da Costa; Bereskin & Parr LLP/S.E.N.C.R.L., s.r.l.

(57) ABSTRACT

A surface cleaning apparatus, such as a portable surface cleaning apparatus is powered by one or more ultracapacitors and a charging unit for same is provided.

18 Claims, 14 Drawing Sheets

(56) References Cited

U.S. PATENT DOCUMENTS

| | | |
|---|---|---|
| 10,165,912 B2 | 1/2019 | Conrad |
| 11,218,017 B2 * | 1/2022 | Conrad .................. H02J 7/0048 |
| 2001/0017531 A1 * | 8/2001 | Sakakibara ......... H02J 7/00047 |
| | | 320/106 |
| 2006/0091858 A1 | 5/2006 | Johnson et al. |
| 2009/0151114 A1 | 6/2009 | Pineschi |
| 2011/0057602 A1 | 3/2011 | Miller |
| 2013/0269147 A1 | 10/2013 | Conrad |
| 2014/0237755 A1 * | 8/2014 | Conrad .................. A47L 9/0018 |
| | | 15/329 |
| 2015/0077043 A1 | 3/2015 | Seidel et al. |
| 2016/0056664 A1 | 2/2016 | Partovi |
| 2016/0115933 A1 | 4/2016 | Koenen et al. |
| 2016/0285289 A1 | 9/2016 | Arends |
| 2016/0380441 A1 | 12/2016 | Groat et al. |
| 2018/0303303 A1 | 10/2018 | Nyberg et al. |
| 2020/0274376 A1 | 8/2020 | Conrad |
| 2020/0274381 A1 | 8/2020 | Conrad |
| 2020/0274382 A1 | 8/2020 | Conrad |

OTHER PUBLICATIONS

English machine translation of JP2017192237, published on Oct. 19, 2017.

* cited by examiner

SURFACE CLEANING APPARATUS, AND A CHARGING UNIT THEREFOR

CROSS-REFERENCE TO RELATED APPLICATIONS

This application is a continuation of U.S. patent application Ser. No. 16/281,788, filed on Feb. 21, 2019, now allowed, the content of which is incorporated herein in its entirety by reference.

FIELD

This disclosure relates generally to appliances, such as a surface cleaning apparatus, that are operable in a cordless mode. This disclosure also relates to charging units for energy storage members used in portable appliances, such as a surface cleaning apparatus, and in particular charging units with an on board energy storage member.

INTRODUCTION

The following is not an admission that anything discussed below is part of the prior art or part of the common general knowledge of a person skilled in the art.

U.S. Pat. No. 8,183,819 B2 of Sugano purports to disclose a boosting-charge power supply apparatus which supplies electric power for charging a mobile body having a boosting-charge control function, which includes: a rectifier for supplying DC power; a first power storage for storing DC power from the rectifier and outputting DC power; a charging circuit which sends DC power from the first power storage directly to a vehicle including a second power storage for storing DC power from the first power storage; and a power-supply controller for stopping the rectifier from supplying electric power to the first power storage while the first power storage is supplying electric power to charge the second power storage. Through the controller, DC power supplied from the first power storage becomes suitable for charging of the second power storage on the vehicle side, thereby enabling the same boosting-charge power supply apparatus to supply electric power and give a boosting charge to a different type of vehicle.

U.S. Pat. No. 8,482,263 B2 of Barrade et al. purports to disclose a method for rapidly charging a rechargeable device. An embodiment of the method comprises charging a first supercapacitor attached to a charging unit. In response to the device coupling to the charging unit, determining whether the charging unit is authorized to charge the device. The first supercapacitor discharging in response to the determining that the charging unit is authorized to charge the device, the discharging of the first supercapacitor resulting in a first current being generated. The first current is transferred to the device through an output of the charging unit for charging a second supercapacitor included in the device. The amount of the first current generated is regulated in response to the voltage at the output increasing at a rate above a set threshold, reducing the rate at which the voltage is increasing.

Unites States Publication No. 2016/0285289 A1 of Arends purports to disclose a battery charger with an internal power storage device that may be used to facilitate fast charging of a battery by using a high C-rate. A battery charger with an internal power storage device may include a control circuit that receives operating mode instructions to operate in a base charging mode or a fast charging mode. In the base charging mode, the battery charger may be configured to concurrently charge a battery and an internal power storage device at a base C-rate using current supplied from an external power source. In the fast charging mode, the battery charger may be configured to charge the battery at a high C-rate, which is substantially higher than the base C-rate, by using the internal power storage device. The battery charger may include an optical reader used to identify battery-specific characteristics and enable the fast charging mode.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In accordance with an aspect of this disclosure, which may be used alone or in combination with any other aspect, it may be desirable for an energy storage member that powers a portable appliance, such as a hand vacuum cleaner, to be charged rapidly. This may reduce the downtime of, e.g., a hand vacuum cleaner that is powered by the energy storage member. This may also allow the e.g., a hand vacuum cleaner to have less on board stored power, which may be achieved by, e.g., using energy storage members that have a lower storage capacity and/or using fewer total energy storage members. As a result, the overall weight of the appliance may be reduced.

Ultracapacitors can be rapidly charged and discharged. Ultra-capacitors also tend to tolerate a greater number of charge and discharge cycles as compared to conventional rechargeable batteries. Using ultracapacitors as the energy supply for portable power appliances allows those appliances to be rapidly charged to an active state. However, ultra-capacitors may have a lower power storage capacity as compared to conventional rechargeable batteries.

To enable a portable appliance that utilizes ultracapacitors, it would be beneficial to provide a nearby power source that is able to recharge the ultra-capacitor rapidly, and in some cases multiple times without being depleted. However, portable power appliances supply such as outdoor lawn and garden tools are often used distant from a mains power supply. Also, a hand vacuum cleaner may be used in a room that is distal to a docking station. In such cases, it would be desirable to be able to charge the power appliance even when a mains power supply is not located nearby. Incorporating an onboard energy storage member into a portable charging unit may facilitate rapid recharges of the ultracapacitors, even when removed from a mains power supply.

In accordance with this broad aspect, there is provided a portable charging unit electrically connectable to a mains power supply, the portable charging unit comprising:

(a) a hand carriable battery charger body;
(b) an onboard energy storage member; and,
(c) a power output circuit, which in operation, is electrically connected to the onboard energy storage member, wherein an ultracapacitor for a portable power appliance is electrically connectable to the portable charging unit, and
in an onboard energy storage member charging mode, the portable charging unit is electrically connected to the mains power supply, and the portable charging unit is operable to charge the onboard energy storage member using power from the mains power supply; and, in an ultracapacitor charging mode, the onboard energy storage member is electrically connected to the power output circuit and the ultracapacitor is also electrically connected to the power output circuit, whereby the portable charging unit is operable to charge the ultracapacitor by discharging stored energy from the energy storage member.

In some embodiments, the onboard energy storage member may comprise a lead acid battery.

In some embodiments, the power output circuit may omit any overvoltage protection circuitry.

In some embodiments, the charging unit may further comprise an output display operable to display a charge state of the onboard energy storage member.

In some embodiments, the charging unit may further comprise an output display operable to display a charge state of the ultracapacitor when the ultracapacitor is electrically connected to the power output circuit.

In some embodiments, in the ultracapacitor charging mode, the ultracapacitor may be recharged at a rate of at least 4 C. In some embodiments, in the ultracapacitor charging mode, the ultracapacitor may be recharged at a rate of at least 6 C.

In some embodiments, the charging unit may further comprise a thermal cooling unit wherein, in the onboard energy storage member charging mode, the thermal cooling unit is thermally connected to the energy storage member. In some embodiments, in the onboard energy storage member charging mode, the thermal cooling unit may be directly thermally connected to the energy storage member. Optionally, in such an embodiment, the ultracapacitor charging mode, the ultracapacitor may be recharged at a rate of at least 4 C.

In some embodiments, the charging unit may further comprise a thermal cooling unit; wherein in the ultracapacitor charging mode, the thermal cooling unit is thermally connected to the ultracapacitor. Optionally, in such an embodiment, in the ultracapacitor charging mode, the ultracapacitor is recharged at a rate of at least 4 C. In some embodiments, in the ultracapacitor charging mode, the ultracapacitor is recharged at a rate of at least 6 C.

In some embodiments, the charging unit may further comprise an electrical cord removably connectable with the mains power supply.

In some embodiments, the portable power appliance may comprise one of a power tool, a landscaping tool, a vacuum cleaner, and a kitchen appliance.

In some cases, it may also be desirable to charge the appliance energy storage member rapidly without overheating the energy storage member. This is the case whether the charging unit is portable and/or the charging of an energy storage member occurs while the energy storage member is located in a portable appliance. However, incorporating cooling components into a portable charger or a portable appliance increases the weight of the charger/appliance, which may be cumbersome, e.g., in portable appliances that are carried by users. However, if an energy storage member may be rapidly charged, then a shorter run time for an appliance may be acceptable by a user. Accordingly, fewer energy storage members may be provided. According, providing a portable charger which includes a cooling member may facilitate a portable appliance having a lower on board energy storage capacity.

In the case of a portable appliance having an on board charger, using fewer energy storage members may offset some or all of the weight of a cooling unit. Accordingly, a thermal cooling unit may be incorporated into the charging unit of a portable appliance. The thermal cooling unit can absorb thermal energy that is generated when the appliance energy storage member is charged, and then dissipate this thermal energy while the appliance is being used. Accordingly, the portable appliance may contain energy storage members that provide, e.g., up to a 5, 6, 7, 8, 9, 10 or 15 minute run time at full power. This may reduce a the weight of a heavy component of the portable appliance thereby permitting a thermal cooling unit to be provided.

In accordance with this broad aspect, there is provided a portable charging unit electrically connectable to a mains power supply, the portable charging unit comprising:
(a) a hand carriable battery charger body;
(b) an onboard energy storage member;
(c) a power output circuit, which in operation is electrically connected to the onboard energy storage member; and,
(d) a thermal cooling unit, which in operation is thermally connected to at least one of the onboard energy storage member and an appliance energy storage member for a portable power appliance,
wherein the appliance energy storage member is electrically connectable to the portable charging unit and,
in an onboard energy storage member charging mode, the portable charging unit is electrically connected to the mains power supply and, the battery charger is operable to charge the onboard energy storage member using power from the mains power supply; and
in an appliance energy storage member charging mode, the onboard energy storage member is electrically connected to the power output circuit and the appliance energy storage member is also electrically connected to the power output circuit, whereby the charging unit is operable to charge the appliance energy storage member by discharging stored energy from the onboard energy storage member to the appliance energy storage member.

In some embodiments, the onboard energy storage member comprises a lead acid battery.

In some embodiments, the appliance energy storage member may comprise a lithium ion battery.

In some embodiments, the appliance energy storage member may comprise an ultracapacitor.

In some embodiments, in the appliance energy storage member charging mode, the thermal cooling unit may be thermally connected to the appliance energy storage member.

In some embodiments, in an appliance energy storage member charging mode, the appliance energy storage member may be recharged at a rate of at least 4 C.

In accordance with this broad aspect, there is also provided a kit comprising:
(a) a portable power appliance comprising a motor and an appliance energy storage member electrically connectable to the motor;
(b) a hand carriable battery charger electrically connectable to a mains power supply, the hand carriable battery charger comprising: an onboard energy storage member electrically connectable to the battery charger; and, a power output circuit having an appliance electrical port that is electrically connectable to the appliance energy storage member,
wherein
in an onboard energy storage member charging mode, the battery charger is electrically connected to the mains power supply, the battery charger is operable to charge the onboard energy storage member using power from the mains power supply; and, when in the appliance energy storage charging mode, the appliance energy storage member is electrically connected to the appliance electrical port and the appliance energy storage member is also electrically connected to the power output circuit, whereby the charging unit is operable to charge the appliance energy storage member by discharging stored energy from the onboard energy storage member to the appliance energy storage member.

In some embodiments, the onboard energy storage member may comprise a lead acid battery.

In some embodiments, the appliance energy storage member may comprise a lithium ion battery.

In some embodiments, the appliance energy storage member may comprise an ultracapacitor.

In some embodiments, in the appliance energy storage charging mode, the appliance energy storage member may be recharged at a rate of at least 4 C. In some embodiments, in the appliance energy storage charging mode, the appliance energy storage member may be recharged at a rate of at least 6 C.

In some embodiments, the portable power appliance may comprise an appliance electrical cord having a first end that is electrically connectable to the appliance energy storage member and a second end; and, the appliance electrical port defines an appliance power outlet that is electrically connectable to the second end of the appliance electrical cord, whereby when the onboard energy storage member is electrically connected to the battery charger and the appliance energy storage member is electrically connected to the appliance electrical port, power from the onboard energy storage member is provided to the appliance energy storage member via the appliance electrical cord.

In some embodiments, the portable power appliance may comprise a main body; the motor is provided within the main body; the appliance energy storage member is removable from the main body; and, the appliance energy storage member is directly mountable to the appliance electrical port.

In some embodiments, the portable power appliance may comprise one of a power tool, a landscaping tool, a surface cleaning apparatus such as a vacuum cleaner, and a kitchen appliance.

In accordance with an aspect of this disclosure, which may be used alone or in combination with any other aspect, it may be desirable to prevent an energy storage member from being overcharged. Allowing the energy storage member to be overcharged can result in damage and degradation of the energy storage member, thereby reducing the usable lifespan of the energy storage member. Accordingly, a charging unit may be adapted to prevent the energy storage member that is being charged from reaching an overvoltage condition.

While active feedback and monitoring systems may be used to prevent overcharging of energy storage members, active feedback components that monitor the charge state of an energy storage member increase the size and cost of the charging unit. Accordingly, a charging unit that is configured to prevent an overcharge state through the configuration of the power output circuit, such as omitting any overvoltage protection circuitry, may protect the energy storage member while reducing size, complexity and manufacturing costs.

In accordance with this broad aspect, there is provided a charging unit electrically connectable to a mains power supply, the charging unit comprising:

(a) a battery charger body;
(b) an onboard energy storage member having a positive electrode and a negative electrode; and,
(c) a power output circuit which omits any overvoltage protection circuitry and which, in a charging mode, is electrically connected to the onboard energy storage member, wherein an ultracapacitor for a portable power appliance is electrically connectable to the portable charging unit, and when the ultracapacitor is electrically connected to the power output circuit, the ultracapacitor is connected between the positive electrode and the negative electrode of the onboard energy storage member in an open circuit charging configuration whereby a maximum charge state of the ultracapacitor is defined by a voltage level of the onboard energy storage member.

In some embodiments, the power output circuit may comprise a load resistor, and when the ultracapacitor is connected to the power output circuit, the load resistor is in series with the ultracapacitor between the positive electrode and the negative electrode.

In some embodiments, the power output circuit may comprise a load inductor, and when the ultracapacitor is connected to the power output circuit, the load inductor is in series with the ultracapacitor between the positive electrode and the negative electrode.

In some embodiments, the charging unit may be hand carriable.

In some embodiments, the charging unit may further comprise an electrical cord removably connectable with the mains power supply.

In some embodiments, the energy storage member may comprise a lead acid battery.

In some embodiments, the energy storage member may comprise a lithium ion battery.

In some embodiments, the charging unit may further comprise an output display operable to display a charge state of the ultracapacitor when the ultracapacitor is electrically connected to the power output circuit.

In some embodiments, the charging unit may further comprise a control circuit operable to determine the charge state of the ultracapacitor by measuring a current flow level through the power output circuit when the ultracapacitor is electrically connected to the power output circuit.

In some embodiments, the charging unit may further comprise an output display operable to display a charge state of the energy storage member.

In some embodiments, when the ultracapacitor is electrically connected to the power output circuit, the ultracapacitor may be recharged at a rate of at least 4 C.

In some embodiments, when the ultracapacitor is electrically connected to the power output circuit, the ultracapacitor may be recharged at a rate of at least 6 C.

In some embodiments, the portable power appliance comprises one of a power tool, a landscaping tool, a surface cleaning apparatus such as a vacuum cleaner, and a kitchen appliance.

In some embodiments, the ultracapacitor is directly connectable with the power output circuit.

When the energy storage member being charged is an ultracapacitor, it may be desirable to reduce the level of inrush current that may arise when a depleted ultracapacitor is initially connected to the charging unit. A depleted ultracapacitor may operate essentially as a short circuit resulting in a high current level for a constant voltage source. Accordingly, in accordance with an aspect of this disclosure, which may be used alone or in combination with any other aspect, incorporating a load component such as a resistive or inductive load component in line with the ultracapacitor may prevent the inrush current from damaging components of the charging unit or overheating the charging unit.

In accordance with this aspect of the disclosure, there is also provided a charging unit electrically connectable to a mains power supply, the charging unit comprising:
 (a) a battery charger body;
 (b) an onboard energy storage member electrically having a positive electrode and a negative electrode; and
 (c) a power output circuit comprising an electrical output port that is electrically connectable to an ultracapacitor and an output circuit load in series with the electrical output port,
wherein
 when the ultracapacitor is electrically connected to the electrical output port, the ultracapacitor is connected to the energy storage member in an open circuit charging configuration whereby a maximum charge state of the ultracapacitor is defined by a voltage level of the onboard energy storage member; and
 when the ultracapacitor is electrically connected to the electrical output port, the ultracapacitor is connected in series with the load component between the positive electrode and the negative electrode whereby an inrush current from the onboard energy storage member to the ultracapacitor is reduced by the load component.

In some embodiments, the output circuit load may comprise one of a load inductor and a load resistor.

In some embodiments, the energy storage member may comprise a lead acid battery.

In some embodiments, the charging unit may further comprise a control circuit operable to determine the charge state of the ultracapacitor by measuring a current flow level through the power output circuit when the ultracapacitor is electrically connected to the electrical output port.

In some embodiments, the charging unit may further comprise an output display operable to display a charge state of the energy storage member.

In some embodiments, when the ultracapacitor is electrically connected to the power output circuit, the ultracapacitor may be recharged at a rate of at least 4 C.

In some embodiments, the ultracapacitor may be directly connectable with the electrical output port.

In some embodiments, the power output circuit may omit any overvoltage protection circuitry.

In accordance with an aspect of this disclosure, which may be used alone or in combination with any other aspect, it may be desirable for an appliance charging unit to be capable of powering a portable power appliance directly, as well as charging the appliance energy storage member. This may allow the charging unit to operate as a mobile power supply for the portable power appliance that has greater capacity than the appliance energy storage members. This may also allow the appliance charging unit to extend the operational period of the portable power appliance beyond what may be provided if the appliance operates only off power from an integrated appliance energy storage member.

In accordance with this broad aspect, there is provided an appliance charging unit electrically connectable to a mains power supply, the appliance charging body comprising:
 (a) a battery charger body;
 (b) an onboard energy storage member; and,
 (c) a power output circuit electrically connectable to a portable power appliance that includes a motor and an appliance energy storage member,
wherein
 when the portable power appliance is connected to the power output circuit, the charging unit is operable in a first mode of operation and a second mode of operation;
 in the first mode of operation the charging unit is operable to power the motor directly using power from the onboard energy storage member; and
 in the second mode of operation, the charging unit is operable to charge the appliance energy storage member using power from the onboard energy storage member.

In some embodiments, the onboard energy storage member may comprise a lead acid battery.

In some embodiments, the onboard energy storage member may comprise a lithium ion battery.

In some embodiments, the appliance energy storage member may comprise an ultracapacitor.

In some embodiments, in the first mode of operation, the charging unit may be operable to charge the appliance energy storage member also while powering the motor.

In some embodiments, when the appliance charging unit is electrically connected to the mains power supply, the charging unit may be operable in a third mode of operation in which power from the mains power supply is used to power the portable power appliance.

In some embodiments, the charging unit may be operable in the first mode of operation when the appliance charging unit is disconnected from the mains power supply.

In some embodiments, the charging unit may be operable in the second mode of operation when the battery charger is disconnected from the mains power supply.

In some embodiments, the charging unit may be hand carriable.

In some embodiments, the power output circuit may include a first power output port and a second power output port; the first power output port may be electrically connectable to the portable power appliance; the second power output port may be electrically connectable to the portable power appliance; wherein, when the portable power appliance is electrically connected to the first power output port, the charging unit is configured to operate in the first mode of operation; and wherein, when the portable power appliance is electrically connected to the second power output port, the charging unit is configured to operate in the second mode of operation.

In some embodiments, the portable power appliance may include an appliance electrical cord, and the first power output port and the second power output port are separately connectable with the appliance electrical cord.

In some embodiments, the power output circuit may include a storage member power output port, and the appliance energy storage member is directly engageable with the storage member power output port.

In some embodiments, the appliance charging unit may further comprise a charger electrical cord removably connectable with the mains power supply.

In some embodiments, the charging unit may include a retractable cord reel, and the charger electrical cord is connected to the retractable cord reel.

In some embodiments, the portable power appliance may comprise one of a power tool, a landscaping tool, a vacuum cleaner, and a kitchen appliance.

In some embodiments, the portable power appliance may comprise an appliance main body, and the charging unit is mountable to the appliance main body.

It will be appreciated by a person skilled in the art that an apparatus or method disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which.

Figure 1:
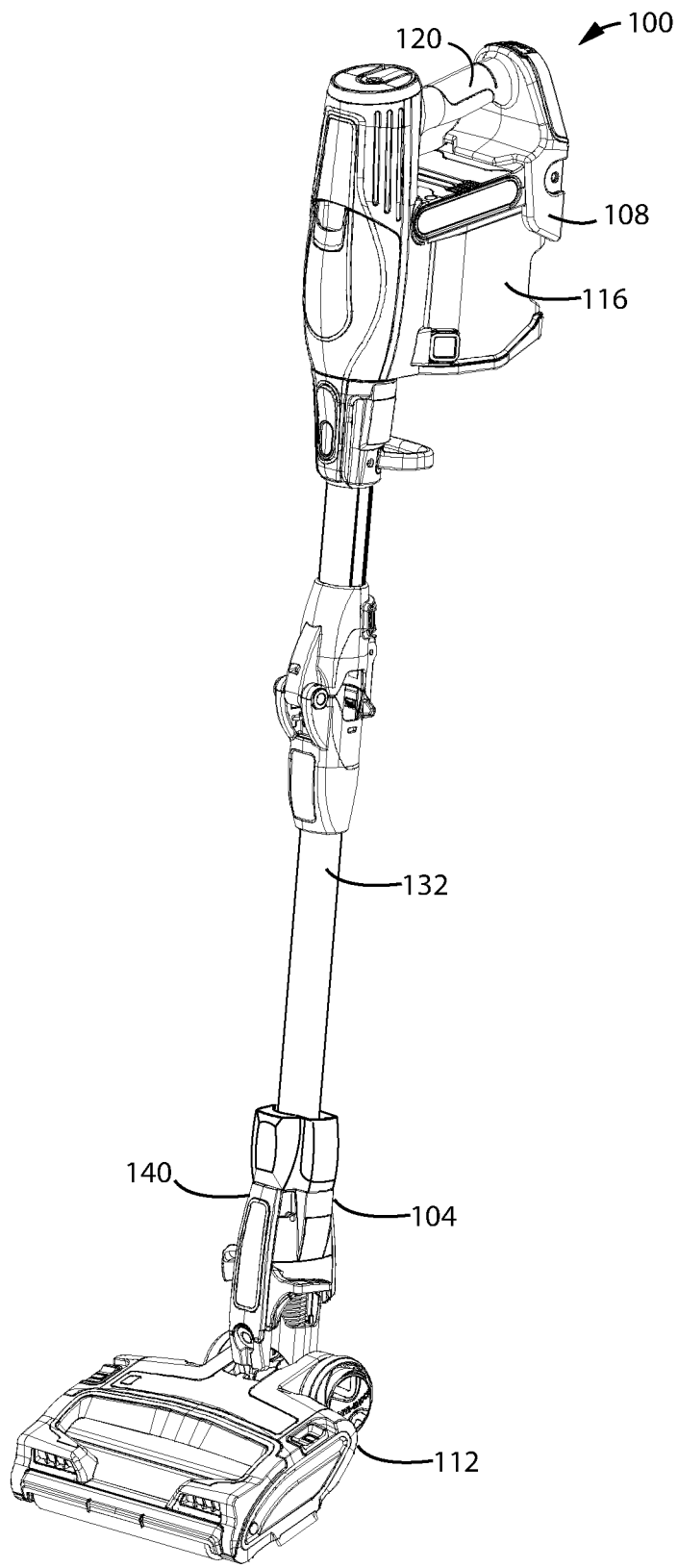
FIG. 1 is a perspective view of an example portable power appliance in accordance with an embodiment.
Figure 2:
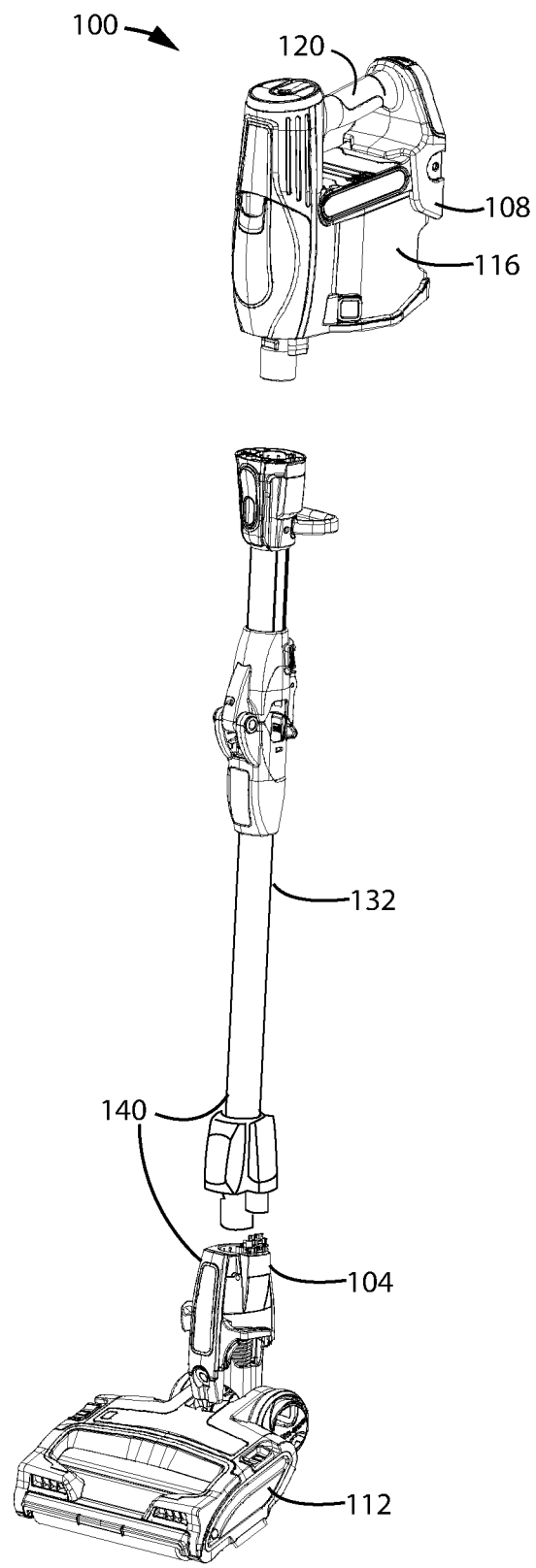
FIG. 2 is an exploded view of the components of a portable power appliance of FIG. 1.
Figure 3:
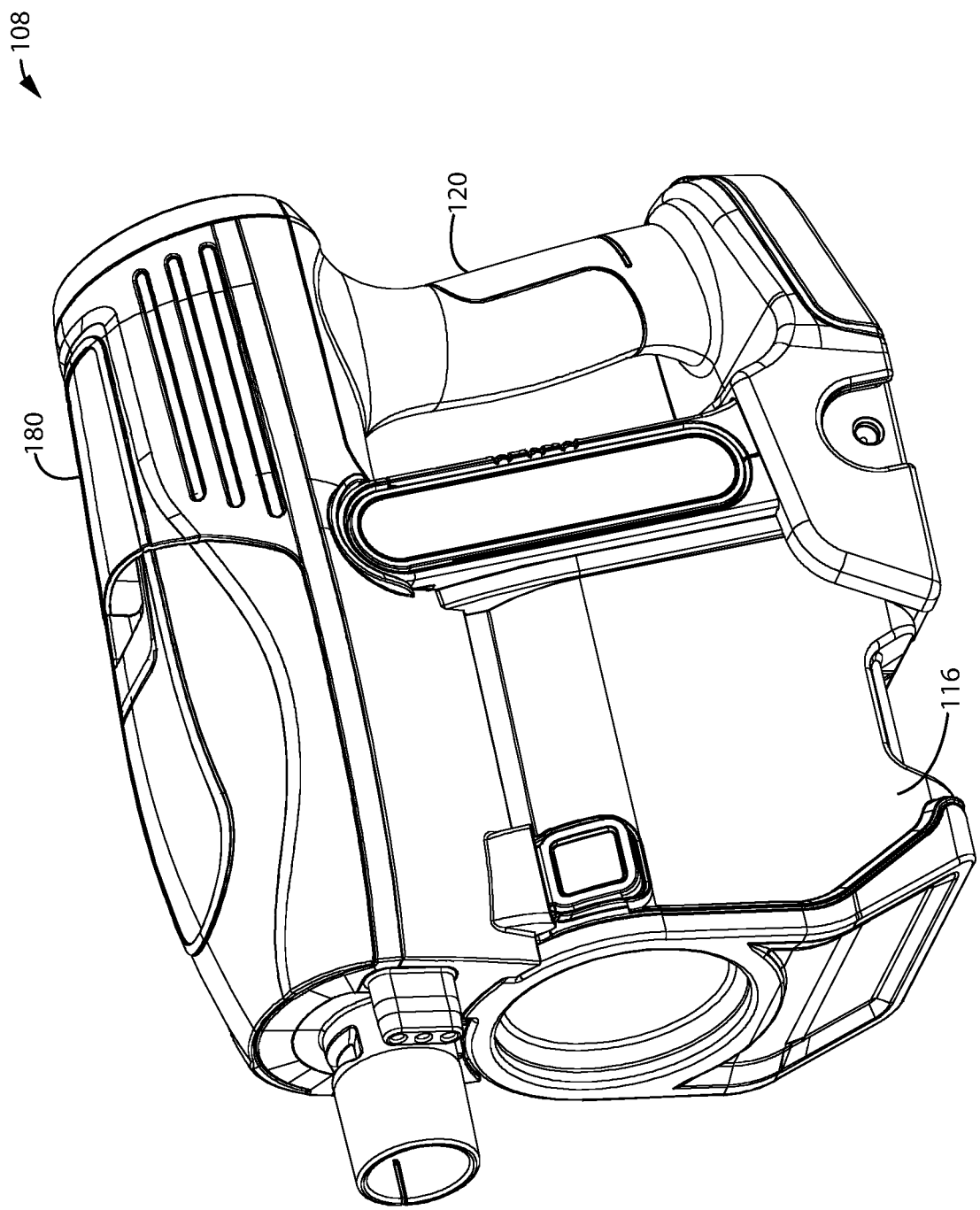
FIG. 3 is a perspective view of a removable portion of the portable power appliance of FIG. 2.

The drawings included herewith are for illustrating various examples of articles, methods, and apparatuses of the teaching of the present specification and are not intended to limit the scope of what is taught in any way.

DESCRIPTION OF EXAMPLE EMBODIMENTS

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. None of the terms "coupled", "connected", "attached", and "fastened" distinguish the manner in which two or more parts are joined together.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

General Description of a Portable Power Appliance

Referring to FIGS. 1-6, exemplary embodiments of a portable power appliance are shown generally as 100. The following is a general discussion of apparatus 100 which provides a basis for understanding several of the features which are discussed herein. As discussed subsequently, each of the features may be used individually or in any particular combination or sub-combination in this or in other embodiments disclosed herein.

In the example of FIG. 1, the portable power appliance 100 is a surface cleaning apparatus. Although portable power appliance 100 is shown as a surface cleaning apparatus, it should be understood that other portable power appliances such as power tools (e.g. drills, screwdrivers, power saws), landscaping tools (e.g. lawn mowers, weed whackers, hedge trimmers, leaf blowers, snow removal equipment such as snow blowers), and kitchen appliances (e.g., a hand mixer) may be used in embodiments described herein.

Surface cleaning apparatus 100 may be any type of surface cleaning apparatus, including for example a stick vacuum cleaner as exemplified in FIG. 1, an upright vacuum cleaner, a canister vacuum cleaner, an extractor or a wet/dry type vacuum cleaner. Optionally, the surface cleaning apparatus 100 may use one or more cyclones and may therefore be a cyclonic surface cleaning apparatus.

Portable power appliance 100 is an example of a power appliance having a base section and a removable portion mounted to the base section. In FIGS. 1-6, surface cleaning apparatus 100 is illustrated as including a floor cleaning unit 104 as the base section, and a portable surface cleaning unit 108 (which may be referred to as a hand vacuum cleaner) that is removably connectable to the floor cleaning unit 104. Other examples of portable power appliances having removable portions may include stand mixers with removable hand mixers, or surface cleaning apparatuses having lift away modules or canisters. An example is an upright vacuum cleaner with a lift away module, such as is shown in US patent publication No. 2014/0237755.

In the example of appliance 100, floor cleaning unit 104 may include a surface cleaning head 112 adapted to clean floors. Portable surface cleaning unit 108 may include an air treatment member 116. Surface cleaning apparatus 100 may include an upright configuration (also referred to as a 'floor cleaning configuration', see FIG. 1) in which portable surface cleaning unit 108 is mounted to floor cleaning unit 104, and dirty air that enters at surface cleaning head 112 flows downstream to portable surface cleaning unit 108 where the dirty air is cleaned by air treatment member 116. Surface cleaning apparatus 100 may also include a 'portable cleaning configuration' (also referred to as a 'hand carriable configuration', or 'above-floor cleaning configuration', see FIGS. 3 and 4), in which portable surface cleaning unit 108 is separated from floor cleaning unit 104, such as to clean above-floor surfaces and surfaces generally inaccessible to or unsuitable for cleaning with surface cleaning head 112 for example. In any such configuration, a user may manipulate the appliance 100 using handle 120.

Figure 4:
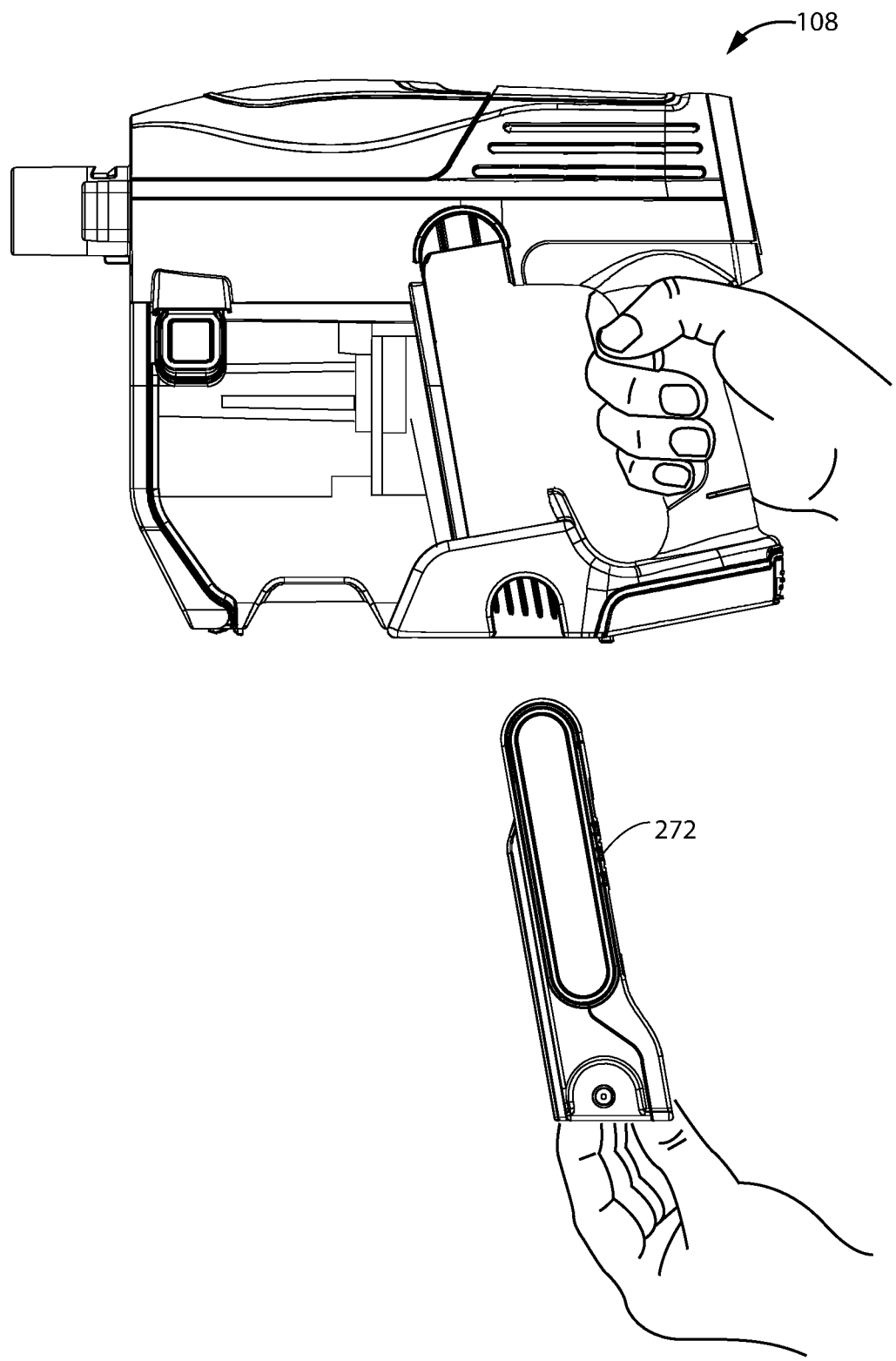
FIG. 4 is a side elevation view of the removable portion of the portable power appliance of FIG. 3 with an energy storage member removed.

In general, portable power appliances described in the embodiments herein include one or more electrical components such as a motor, control unit, and/or output display. For instance as shown in FIG. 4, portable surface cleaning unit 108 may include a suction motor 212 to generate vacuum suction through the air flow path of the surface cleaning apparatus 100. Various other types of electrical motors or actuators may be used depending on the type of appliance. In the example shown, suction motor 212 may be a fan-motor assembly including an electric motor and impeller blade(s).

A trend in some portable power appliances such as cordless vacuum cleaners is to provide longer runtime in a single charge. For example, some cordless vacuum cleaners can run continuously for 30 minutes or more before recharging. However, such vacuum cleaners require multiple large, expensive, heavy batteries. In use, this can make these vacuum cleaners unwieldy to carry, in both size and weight. Moreover, it can take a long time to fully recharge a plurality of high capacity batteries, and batteries often degrade and require replacement during the working life of a vacuum cleaner. The battery replacement cost is a significant expense for the user.

In some embodiments disclosed herein, a portable power appliance may be equipped with an energy storage member comprising or consisting of one or more capacitors. As compared with rechargeable batteries (e.g. lead-acid, Ni-Cad, NiMH, or lithium), a capacitor can be recharged much faster, and have a much longer lifespan (measured in charge cycles). With battery powered appliances, traditional design philosophy is that it is important to have a long runtime to mitigate having to recharge in the middle of a cleaning session, since the recharge could take several hours, which would be disruptive to the user who wishes to finish their cleaning session in a timely manner.

In contrast, with a capacitor powered portable appliance, the need to recharge mid-session may be minimally disruptive as it may only require a few seconds to a few minutes to recharge. Therefore, a capacitor powered portable appliance may include comparatively less energy storage capacity because avoiding a recharge mid-session is not a priority. As a result, a capacitor powered portable appliance may have one or more capacitor that are relatively smaller and lighter as compared with a high capacity battery. This can make a capacitor powered portable appliance unit smaller and lighter overall, without compromising performance (e.g., air flow rate and/or suction power) or user experience. Moreover, the long lifespan of capacitors (often 1 million charge cycles or more) means that the capacitors will not generally require replacement during the working life of the portable appliance.

For convenience, reference to "a capacitor" herein means "one or more capacitors", unless expressly stated otherwise (e.g. "a single capacitor"). Similarly, reference to "a battery" herein means "one or more batteries", unless expressly stated otherwise (e.g. "a single battery").

Figure 6:
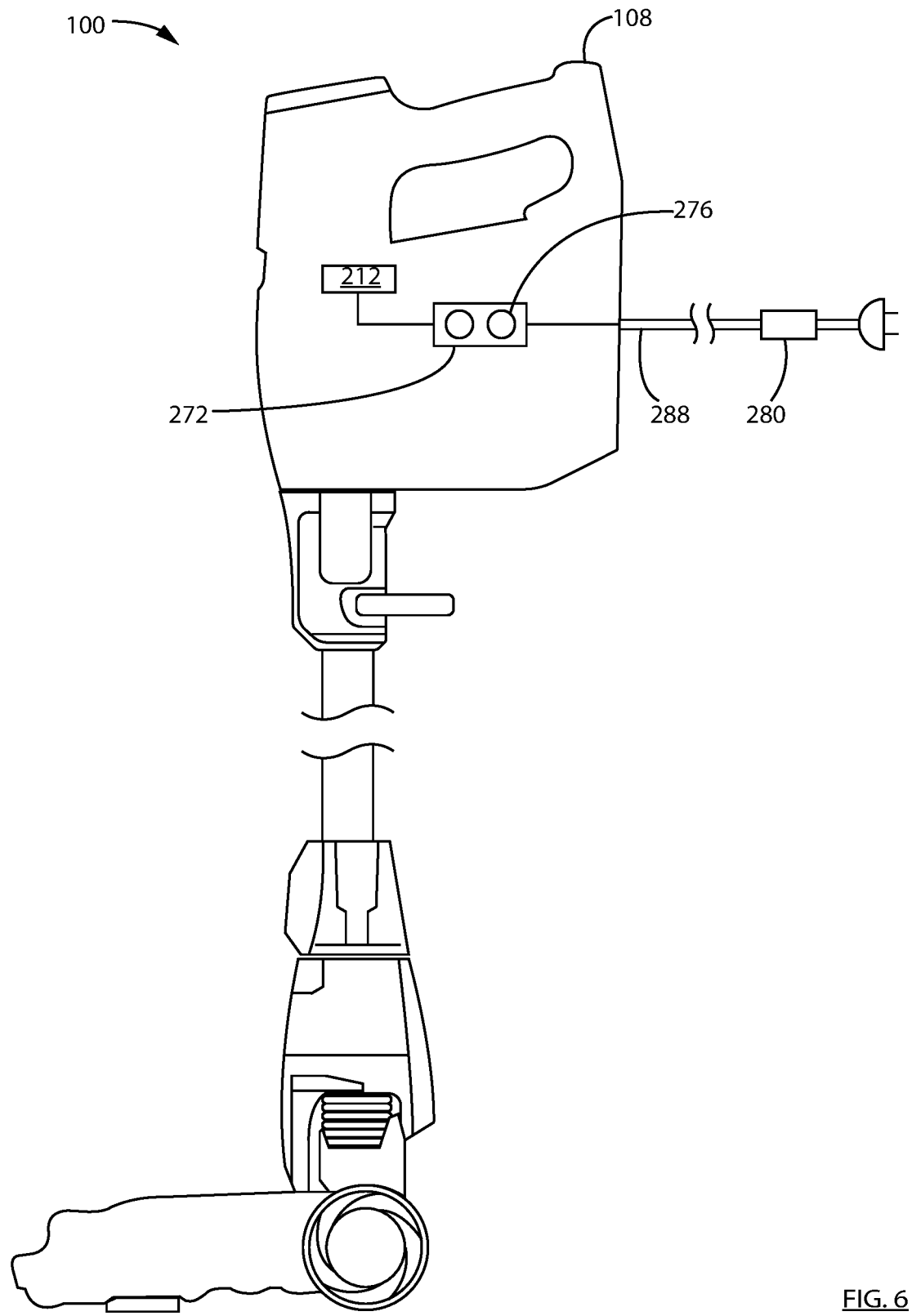
FIG. 6 is a schematic illustration of a portable power appliance and charging unit in accordance with an embodiment.

Referring to FIGS. 4 and 6, the portable surface cleaning unit 108 of appliance 100 is shown including an energy storage member 272. Energy storage member 272 may comprise or consist of a capacitor 276. For example, capacitor 276 may be the only significant energy storage in energy storage member 272, or energy storage member 272 may further include a battery. Some or all of the power consuming elements of appliance 100 may be powered by capacitor 276. For example, at least suction motor 212 may be powered by capacitor 276. In some embodiments, some or all power consuming elements of portable surface cleaning unit 108 may be exclusively powered by capacitor 276. For example, at least suction motor 212 may be exclusively powered by capacitor 276 in some embodiments.

In some embodiments, the appliance energy storage member 272 included in the removable section 108 may include all of the energy storage members for the entire appliance. Additionally or alternatively, the base section 104, which may include a brush motor, may include one or more appliance energy storage members 272.

Capacitor 276 may be any capacitor suitable for supplying power required to operate at least suction motor 212. For example, capacitor 276 may be an ultracapacitor (also referred to as a supercapacitor or Goldcap™). As compared to an electrolytic capacitor, ultracapacitors have dramatically higher energy density (per unit mass and per unit volume). Types of ultracapacitors include electrostatic double-layer capacitors (EDLCs), electrochemical pseudocapacitors, and hybrid capacitors that store charge both electrostatically and electrochemically. Capacitor 276 may be recharged by power from a power source external to portable surface cleaning unit 108.

As shown in FIGS. 1-4, the portable power appliance 100 may have a main body 180. The motor 212 can be contained within the main body 180 of the appliance 100. The appliance energy storage member 272 can also be mounted to, or within the main body 180. In some embodiments, the appliance energy storage member 272 may be removable from the main body 180 for charging.

Figure 5:
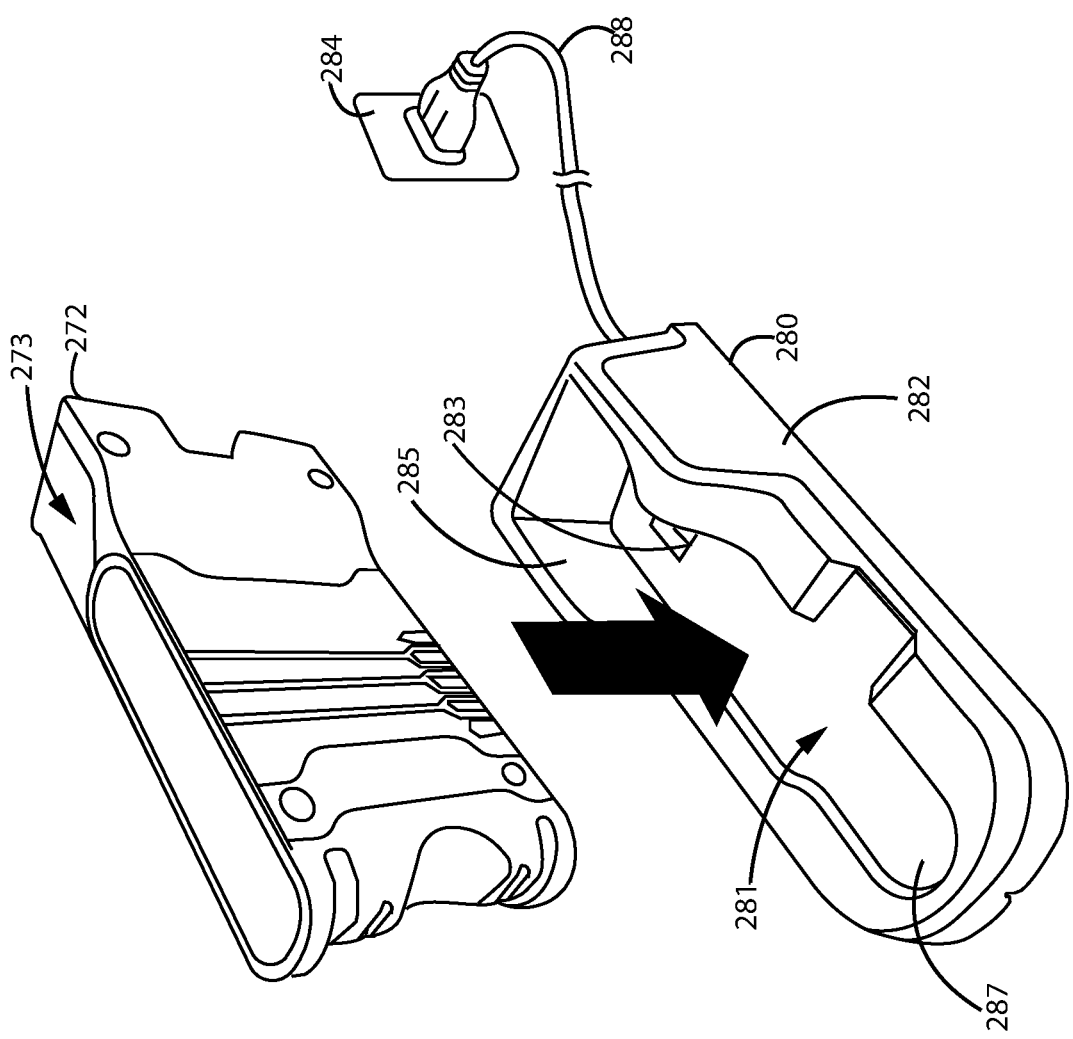
FIG. 5 is a perspective view of the energy storage member of FIG. 4 and an example charging unit in accordance with an embodiment.

FIGS. 4-5 show an example in which energy storage member 272 is removable from portable surface cleaning unit 108 for electrically connecting to an external charging unit 280. The energy storage member 272 may be maintained within an energy storage member housing 273. The appliance energy storage member 272 may be removed from the appliance 100 while within this housing 273. Alternately, only the energy storage member 272 may be removable or a housing 273 may be removable and the energy storage member 272 may then be removed from housing 273 for charging.

External charging unit 280 may be powered by an electrical connection to a stationary power supply 284 (e.g. mains power). An advantage of this design is that it can allow the user to swap a discharged energy storage member 272 for a charged energy storage member 272, which may be stored on the charging unit 280. The external charging unit 280 also reduces the size and weight of portable power appliance 100 as compared with including the charging unit 280 within portable power appliance 100. Further, this design may not require portable appliance 100 to have a power cord or power cord connector, which may also reduce the size and weight of appliance 100 all else being equal.

Alternatively or in addition to energy storage member 272 being removable for recharging, energy storage member 272 may be rechargeable in-situ without removal from appliance 100. For example, FIG. 6 shows an embodiment in which the portable surface cleaning unit 108 of appliance 100 includes a power cable 288 for transmitting power from charging unit 280 towards energy storage member 272. An advantage of a non-removable energy storage member 272 is that it may not require a discrete outer shell for user handling and transportation since it is permanently held within main body 180. Further, a non-removable energy storage member 272 may not require hardware to support easy user removal and insertion of energy storage member 272. This may reduce the size and weight of portable surface cleaning unit 108 as compared with including charger 280 within portable surface cleaning unit 108, all else being equal.

Figure 18:
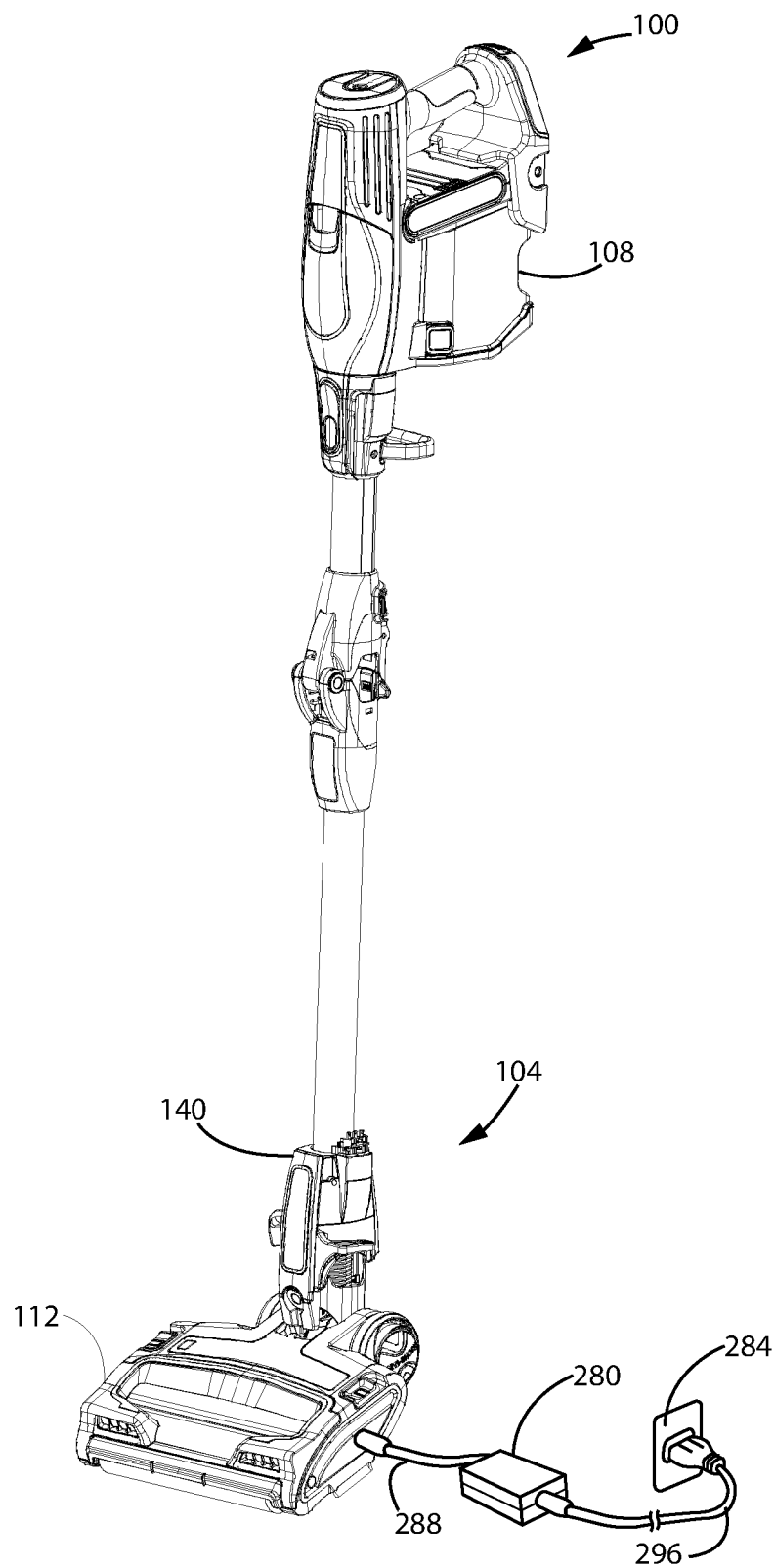

Alternatively, appliance 100 may include a power cable 288 that is electrically connectable to a different section of appliance 100, such as surface cleaning head 112 (See for example FIG. 18). The power cable 288 can be used to transmit power from charging unit 280 to energy storage member 272 via wiring internal of appliance 100.

In some embodiments power cable 288 may be permanently connected to appliance 100. An advantage of this design is that it may not require appliance 100 to have hardware to support a removable connection, and it may make connecting portable appliance 100 to a stationary power supply 284 more convenient to the extent that a separate power cable 288 does not need to be relocated to the selected power supply 284.

Alternatively, power cable 288 may be removably connected to portable appliance 100. For example, power cable 288 may be connected to portable appliance 100 only when it is desired to recharge energy storage member 272. An advantage of this design is that it does not require the user to carry the weight of power cable 288 when portable appliance 100 does not require a connection to a stationary power supply 284 (e.g. when not recharging).

In an alternative configuration, appliance 100 may include the charging unit 280 within a portion of the appliance body. An advantage of this design is that it may make connecting portable appliance 100 to a stationary power supply 284 more convenient, in that an external charger does not need to be relocated to the selected stationary power supply 284. For example, the charging unit 280 may be integrated within the base section 104 of the appliance 100 (see for example FIG. 16).

Figure 16:
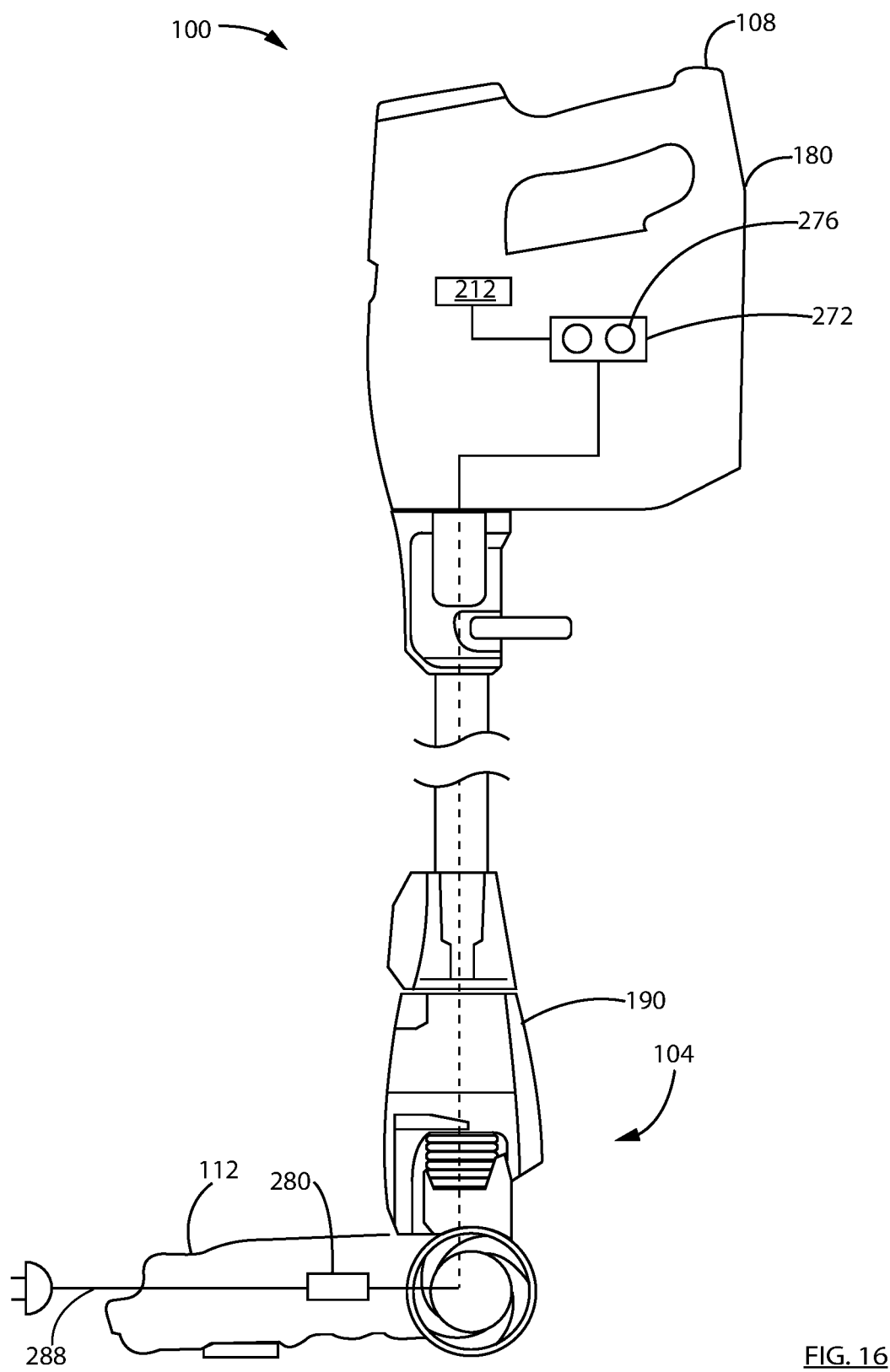
FIG. 16 is a schematic illustration of a portable power appliance in accordance with an embodiment.
Figure 17:
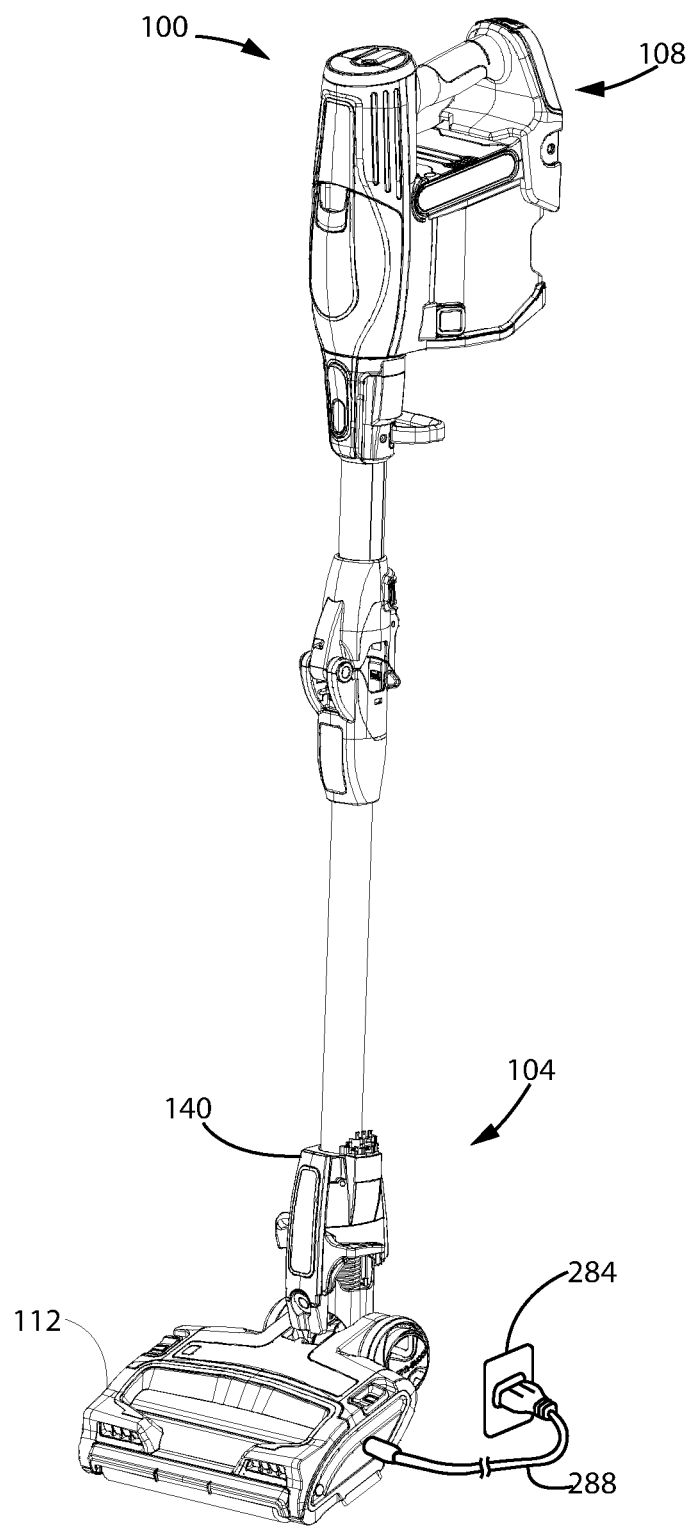
FIG. 17 is a perspective view of the portable power appliance of FIG. 15 connected by a power cable to a stationary power supply, in accordance with an embodiment; and, FIG. 18 is a schematic illustration of another example portable power appliance in accordance with an embodiment.

Reference is now made to FIGS. 16-17. FIGS. 16 and 17 illustrate an example of a portable power appliance that includes an integrated charging unit 280. In portable power appliances, such as appliance 100, having a base unit 104 and a separate removable section 108, the charging unit 280 may be integrated with the base unit 104. The charging unit 280 may then recharge the energy storage members 272 in the removable section 108, when the removable section 108 is mounted to the base 104.

As shown, the appliance 100 may include charging unit 280 within the floor cleaning unit 104. For example, charger 280 may be located in surface cleaning head 112 as shown, or in upper section 140. When portable surface cleaning unit 108 is connected to floor cleaning unit 104, charger 280 may recharge energy storage member 272 (including at least capacitor 276). In some embodiments, when charging unit 280 is connected to a source of power, with the removable section mounted to the base, the charging unit 280 may power the appliance 100 while simultaneously recharging the energy storage member 272 of the removable section. In some embodiments, the charging unit 280 may operate to recharge the energy storage member 272 even when disconnected from a power supply, e.g. by discharging power from an onboard energy storage member 292 as described subsequently herein.

In some embodiments, a portable power appliance 100 may include an appliance energy storage member 272 within the base section 104. For example, FIG. 18 illustrates an example in which an appliance energy storage member can be mounted within the surface cleaning head 112 or upper section 140 of the base 104. This appliance energy storage member can be charged by charging unit 280 in an analogous manner to the appliance energy storage member 272 mounted within the removable section 108. In some cases, the removable section 108 may also include an additional appliance energy storage member 272 that may be charged concurrently with, or separately from, the appliance energy storage member 272 mounted within the base section.

Portable Charging Unit Including Onboard Energy Storage Member

As noted above, it may be desirable for an energy storage member to be charged rapidly. It may also be desirable to provide a portable charging unit that can charge the energy storage member, even when not connected to a stationary power supply. This may reduce the downtime of an appliance powered by the energy storage member. This may also allow the appliance to use energy storage members with a lower power storage capacity, or fewer total energy storage members, and reduce the overall weight of the appliance when being used with the energy storage members.

In embodiments described herein, a charging unit may be provided with an onboard energy storage member and the onboard energy storage member is used to charge an appliance energy storage member, an energy storage member that is itself then used to power a portable power appliance, such as an ultracapacitor. The charging unit may be portable to facilitate charging of the portable power appliance, even at locations distant from stationary power supplies such as mains power. For example, the charging unit could be transported on floor cleaning unit 112 or be hand carriable by a user.

The features in this section may be used by itself in any appliance (e.g., surface cleaning apparatus) or in any combination or sub-combination with any other feature or features described herein.

Figure 7:
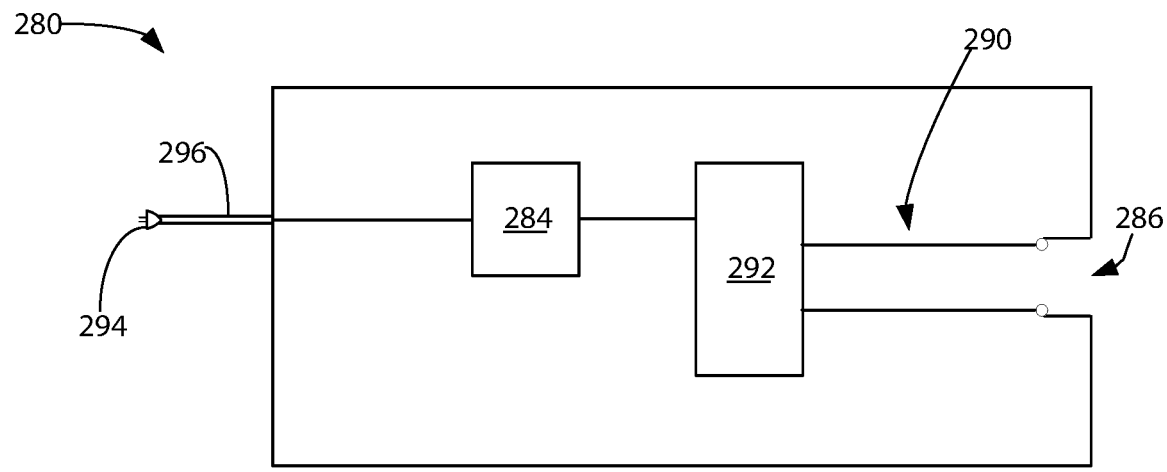
FIG. 7 is a schematic illustration of an example charging unit in accordance with an embodiment.

Referring to FIGS. 5 and 7, shown therein is an example embodiment of a charging unit shown generally as 280. The charging unit 280 is a simplified example of a charging unit in which an onboard energy storage member 292 is included as part of the charging unit 280. The charging unit 280 is adapted to charge an appliance energy storage member, such as energy storage member 272 used with portable appliance 100. It will be appreciated that onboard energy storage member 292 may or may not be removably mounted to charging unit 180 and may be fully contained in or partially nested in charging unit 180.

The charging unit 280 generally includes a charger body 282 (which may be referred to as a hand carriable battery charger body), charger circuitry 284, an onboard energy storage member 292, and a power output circuit 290. The charging unit 280 includes a power input port 294 and at least one power output port 286 (also referred to as an appliance electrical port).

Charger 280 may include one or more charging circuits 284 for (i) supplying power from a stationary power supply (i.e. via a power cable) to energy storage member 292, and/or (ii) supplying power from onboard energy storage member 292 to appliance energy storage member 272, and/or (iii) supplying power from a stationary power supply (i.e. via a power cable) to appliance energy storage member 272.

As shown in the example of FIG. 7, the charging unit 280 includes a charging circuit 284 that is adapted to supply power from a stationary power supply to onboard energy storage member 292 using power cable 296. The charging unit 280 also includes a power output circuit 290 that is adapted to supply power from onboard energy storage member 292 to an appliance energy storage member 272. In operation, the power output circuit 290 is adapted to electrically connect the onboard energy storage member 292 and the appliance energy storage member 272.

The charging unit 280 can be configured to operate in a number of different charging modes. In a first charging mode (also referred to as an onboard energy storage member charging mode), the charging unit 280 can charge the onboard energy storage member 292 using power from a stationary or mains power supply 284. The charging unit 280 can be electrically connected to the mains power supply by power input port 294. For instance, an electrical cord 296 can be used to electrically connect input port 294 to charging circuitry 284.

The charging circuitry 284 can be adapted to convert the power from the mains power supply into a form usable to charge the onboard energy storage member 292. For instance, the mains power supply may provide AC power, while the onboard energy storage member 292 may required DC current in order to be charged. The charging circuitry 284 can thus include a rectifier operable to rectify the alternating current received from the mains power supply into direct current usable to charge the onboard energy storage member 292.

The charging unit 280 can also be configured to operate in a second charging mode, namely an appliance energy storage member charging mode (also referred to as an ultracapacitor charging mode where the appliance energy storage member 272 includes an ultracapacitor). In the second mode of operation, the onboard energy storage member 292 is connected to power output circuit 290. The appliance energy storage member 272 is also connected to power output circuit 290 via power output port 286. The charging unit 280 can then charge the appliance energy storage member 272 by discharging stored energy from the onboard energy storage member 292 to the appliance energy storage member 272. It will be appreciated that onboard energy storage member 292 may also be recharged while onboard energy storage member 292 is charging appliance energy storage member 272.

Figure 8A:
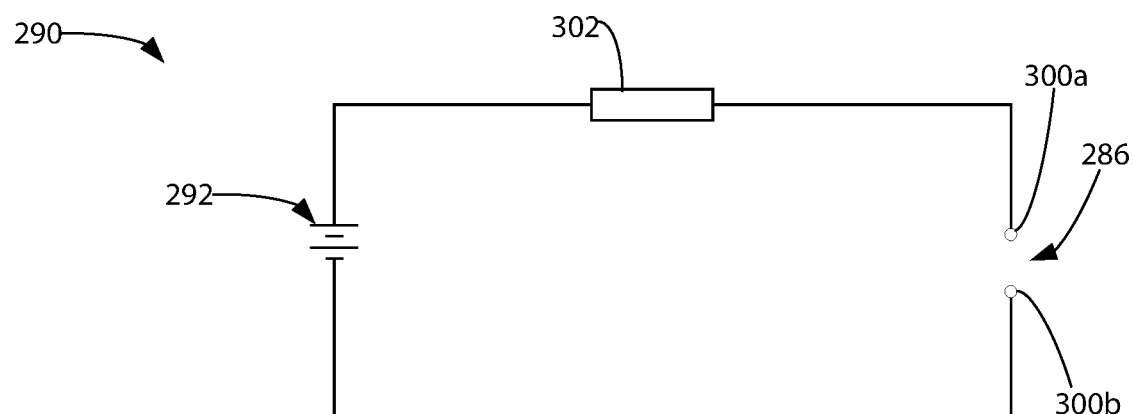
FIGS. 8A-8D are schematic illustrations of example power output circuits for the charging unit of FIG. 7.

FIGS. 8A-8D illustrate various configurations of power output circuit 290. As shown in FIG. 8A, the power output circuit 290 can include onboard energy storage member 292 electrically connected to power output port 286. The power output port 286 can include output electrodes 300a and 300b between which the appliance energy storage member 272 can be connected for charging. The output electrodes 300a and 300b can be connected to the respective positive and negative electrodes of the onboard energy storage member 292 (when onboard energy storage member 292 is connected to the power output circuit 290).

Figure 8B:
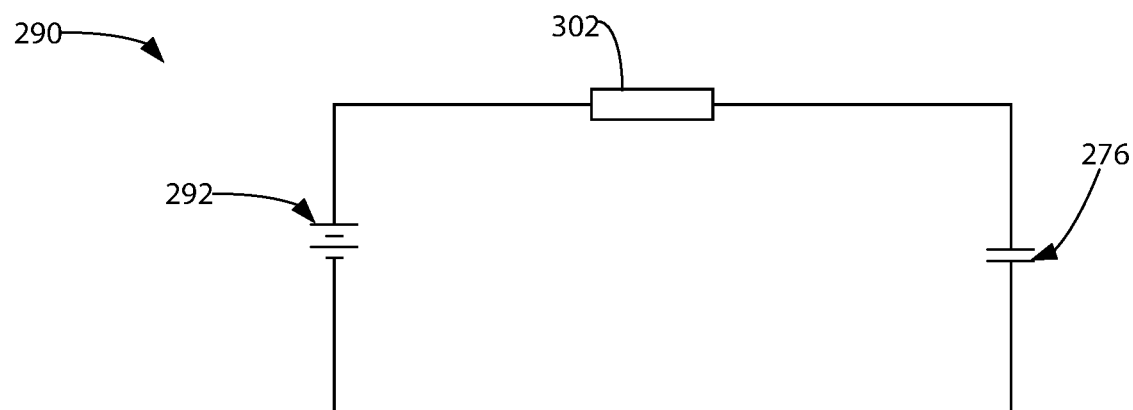

The power output circuit 290 can also include a load component 302. The load component may be in the form of a resistive load element or an inductive load element. When a capacitor 276 is used as the appliance energy storage member 272, and the depleted capacitor 276 is connected to the output port 286 (as shown in FIG. 8B), the capacitor 276 may effectively provide a short circuit in the output power circuit 290. As a result, the initial inrush current through power output circuit 290 may be quite high. Providing the load component 302 in series with the output port 286 minimizes the maximum current that is able to flow through the power output circuit 290, even in a short circuit condition.

In some embodiments, the appliance energy storage member 272 may be connected to the power output circuit 290 directly. The charging unit 280 may define an energy storage member receiving area 281 (as shown in FIG. 5) within which the appliance energy storage member 272 can be mounted. The power output port 286 can include an energy storage member connector 283 that is positioned within the energy storage member receiving area 281 to engage the appliance energy storage member 272 when received within the energy storage member receiving area 281. The connector 283 can electrically connect the appliance energy storage member 272 to the power output circuit 290. Various types of connectors may be used, including power connectors, USB connectors, magnetic connectors and so on.

Figure 8C:
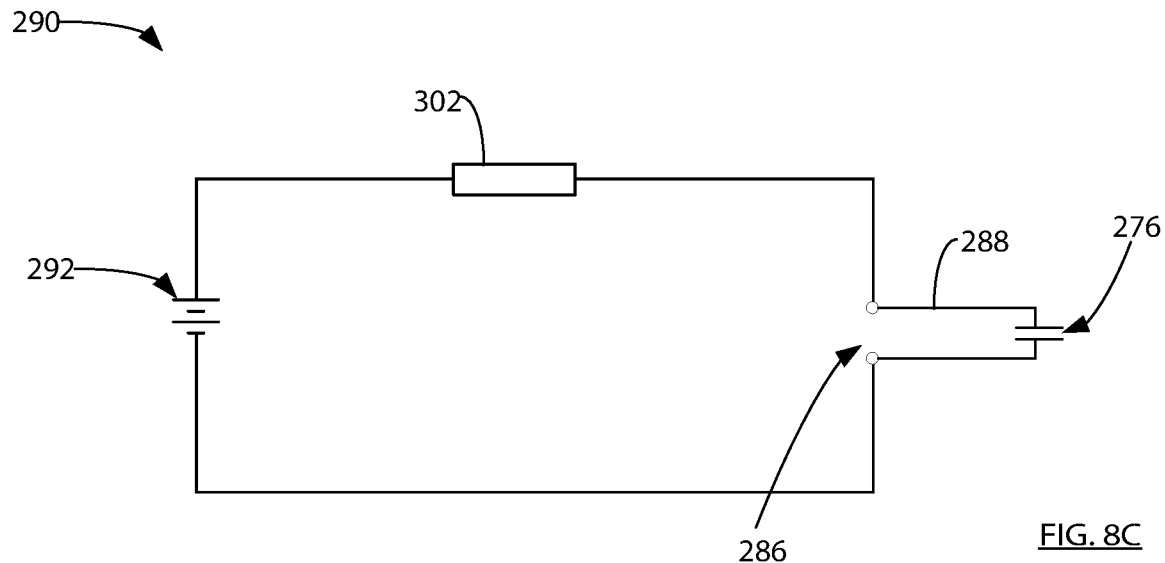

In other cases, the appliance 100 may include an electrical cord 288 that is connectable to the output port 286. The cord 288 may then connect the appliance energy storage member 276 to the output port 286 (as shown in FIGS. 6 and 8C). The output port 286 may define an appliance power outlet to which the cord 288 can be connected.

The charging unit 280 may also be adapted to prevent overcharging of capacitor 276 without any overvoltage protection circuitry. Configuring the power output circuit 280 with the output port 286 in an open circuit charging arrangement can ensure that capacitor 276 stops charging once the voltage level of the onboard energy storage member 292 is reached.

Figure 8D:
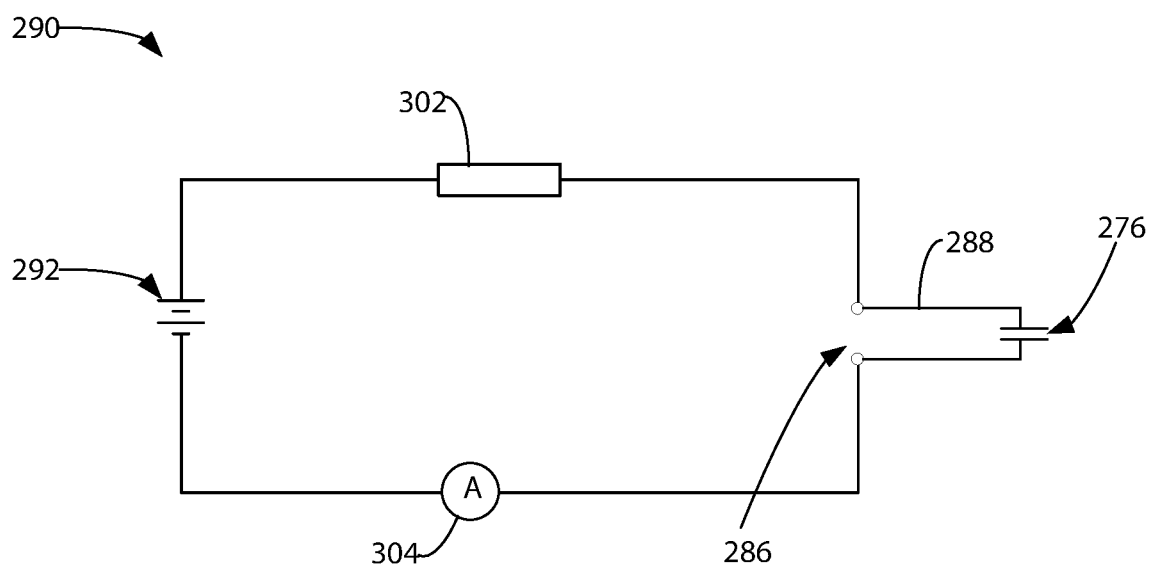

The charging unit 280 may also be adapted to monitor a charge state of the appliance energy storage member 272. In some embodiments, the charging unit 280 may determine the charge state of the appliance energy storage member 272 without requiring any feedback from the appliance energy storage member 272 or appliance 100. For instance, the current through power output circuit 290 may be monitored (e.g. using an ammeter 304 as shown in FIG. 8D) in order to assess the charge state of the capacitor 272.

Optionally, the charging unit may also include an output display. The output display may be configured to display a charge state of the appliance energy storage member 272.

Additionally or alternatively, the output display can be configured to display a charge state of the onboard energy storage member 292. This allows a user to determine when it is necessary to connect the charging unit 280 to mains power to recharge the onboard energy storage member 292.

Figure 9:
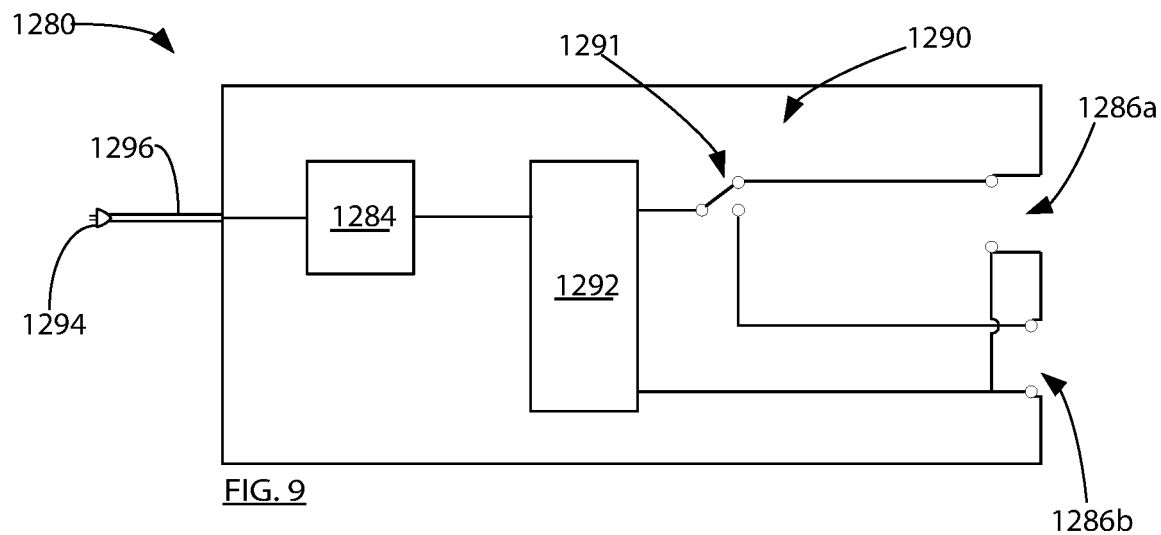
FIG. 9 is a schematic illustration of another example charging unit in accordance with an embodiment.

FIG. 9 illustrates another example of a charging unit 1280. As with charging unit 280, the charging unit 1280 includes an onboard energy storage member 1292, charging circuitry 1284, a power output circuit 1292, and an electrical input port 1294 and cord 1296. The charging unit 1280 can be housed within a charging unit body similar to charging unit body 282.

As shown in FIG. 9, the charging unit 1280 may include a power output circuit 1290 with multiple power output ports 1286a and 1286b. A first power output port 1286a may be mounted within a receiving area within which the appliance energy storage member 272 can be mounted directly. The second power output port 1286b may define a power outlet to which an electrical cord can be attached.

The power output circuit 1290 can connect either power output port 1286 to an onboard energy storage member 1292 using switch 1291. In some cases, the switch 1291 may be actuated automatically in response to detecting an electrical connection at either of the output ports 1286. For instance, the power output circuit 1290 may include sensors adapted to detect electrical connection to the output ports 1286. The sensors can be configured to operate switch 1291 to connect the engaged power output circuit 1286 to the power output circuit 1290 and onboard energy storage member 1284.

Energy storage member 292 can be any device suitable to supply power for fully recharging energy storage member 272 one or several times. For example, energy storage member 292 may include a battery and/or a capacitor that collectively have an energy storage capacity sufficient to recharge energy storage member 272 (or at least capacitor 276) two or more times (e.g. three or more times, or six or more times).

In some embodiments, the charging unit 280 may be adapted to operate with a portable power appliance such as appliance 100 in which an ultracapacitor provides the appliance energy storage member. The onboard energy storage member 292 may have sufficient power capacity to fully recharge the capacitor 276 of the portable power appliance 100 several times. For example, the charging unit 280 may include a relatively inexpensive, rechargeable energy storage member (e.g. a lead acid, NiCad, NiMH, or lithium) with an energy storage capacity that is several times greater than the capacitor 276 of the portable power appliance 100.

Alternatively, the appliance energy storage member 272 may include one or more lithium ion batteries. The charging unit 280 may facilitate rapid recharging of the lithium ion batteries. This may allow the portable power appliance to operate using fewer batteries, reducing the overall appliance weight.

The appliance energy storage member 272 may have sufficient energy capacity to power at least motor 212 (or all power consuming parts of portable surface cleaning unit 108) for at least 3 minutes (e.g. 3, 4, 5, 6, 7, 8, 9, 10, 11, 12, 13, 14 or 15 minutes). For example, an appliance energy storage member 272 with a capacity of at least 5 Wh can provide 100 W of power to a suction motor 212 for at least 3 minutes. As mentioned above, all of the energy storage may be provided by capacitor 276 in some embodiments. A three-minute runtime may be plenty for short operational sessions, such as to clean crumbs off a couch, to clean dirt around a planter, or to clean cereal spilled by a child for example.

Accordingly, the onboard energy storage member 292 may have a power capacity that is several times greater than appliance energy storage member 271 in order to fully recharge the capacitor 276 of the portable power appliance 100 several times. For example, the onboard energy storage member 292 adapted to charge an energy storage member 272 with a capacity of at least 5 Wh may itself have a capacity of at least 20 Wh (or even greater to allow for losses during charging).

If a task is larger, and requires more runtime than energy storage member 272 can provide, then energy storage member 272 can be quickly recharged. For example, charging unit 280 may be configured to recharge capacitor 276 at a rate of at least 4 C (e.g. at least 6 C, such as 4 C to 10 C, or 6 C to 10 C). This can allow capacitor 276 to be fully recharged in a matter of seconds or minutes, as compared with hours in the case of many batteries.

In the example shown, the charging unit 280 is portable. For instance, the charging unit may weigh 1-5 pounds, 1-3 pounds.

Optionally, the charging unit 282 may include a handle on the exterior of the charger body 282. A user may grasp the handle to lift and carry the charging unit 280. The charging unit 280 can thus be re-positioned to facilitate charging and/or powering a portable power appliance, as well to facilitate charging of the onboard energy storage member 292.

Additionally or alternatively, the charging unit 280 may include one or more wheels to facilitate portability of the charging unit. In alternative embodiments, the charging unit 280 may omit a handle and/or wheels but may nonetheless be portable. For instance, a user may carry the charging unit 280 by grasping the exterior of the charger body 282. In some embodiments, the charging unit 280 may be integrated within the base of a portable power appliance as described herein above.

The charging unit 280 can also include a power input port 294. The power input port 294 can be detachably attached to a mains power supply, for instance by inserting the power input port 294 into a household power outlet 284 (e.g., it male be a male plug member). The power input port 294 can subsequently be detached from the mains power supply to allow the charging unit 280 to be re-positioned.

The power input port 294 can be coupled to the end of an electrical cord 296. The electrical cord 296 may extend out from the charger body 282 to allow the charging unit 280 to be removably connected to a mains power supply.

Optionally, the charging unit 280 may include a retractable cord reel operable to wind and hold the cord 296. The electrical cord 296 can be mounted on the cord reel. The cord reel may be of any suitable configuration and may be a manually actuated reel (for example via a hand crank) or an automated reel.

If the reel is automated (i.e. can wind the cord without manual user intervention), it may be driven by any suitable mechanism including, for example, a spring, a biasing mechanism and/or a motor. The motor used may be an electric motor that can be operated at a speed that is suitable for winding the cord. If the motor is electric, preferably the cord reel is provided with a power source (either on board or as part of the charging unit 280 such as energy storage member 292) so that the cord reel motor can be powered even after the electrical cord 296 has been unplugged.

Optionally, the charging unit 280 may include a sensor adapted to sense movement of the charging unit 280. The sensor may be operatively connected to the cord reel and the power cord 296 may be unwound from the cord reel based on movement of the charging unit 280. This may prevent the power cord 296 from being accidentally detached from the mains power supply when the charging unit 280 is moved.

In some embodiments, the charging unit 280 may be provided separately from the portable power appliance 100 (see for example FIG. 6). For instance, the portable power appliance 100 may operate using a rechargeable energy storage member 272 that is compatible with charging unit 280. The charging unit 280 may then be used to charge the energy storage member 272 in-situ (see for example FIG. 6) or when removed from portable power appliance (see for example FIG. 5).

In some embodiments, the charging unit 280 and portable power appliance 100 may be provided together as a kit. For instance, the charging unit 280 and charger energy storage member 292 may be provided along with the portable power appliance 100 and appliance energy storage member 272 ensuring compatibility between the charging unit 280 and the appliance energy storage member 272.

Thermal Cooling Unit

The rate at which an energy storage member can be charged, without suffering damage or substantial degradation, is limited by heat generated during charging. When an energy storage member is charged, the generated heat can raise the temperature of the energy storage member to dangerous or damaging levels. In accordance with another aspect, the charging unit and/or a portable appliance or an appliance includes a thermal cooling unit that cools an energy storage member during charging. This can help keep the temperature of the energy storage member within safe limits when the energy storage member is charged rapidly (e.g. at a rate of 4 C or faster). Alternately, or in addition, this can help keep the temperature of the energy storage member within safe limits when the energy storage member is discharged rapidly (e.g. at a rate of 4 C or faster).

The features in this section may be used by itself in any appliance (e.g., surface cleaning apparatus) or in any combination or sub-combination with any other feature or features described herein.

Figure 11:
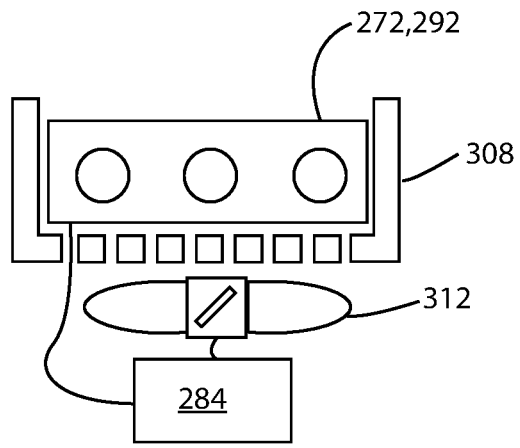
FIGS. 11-15 are schematic illustrations of an energy storage member, a thermal cooling unit, and a charger circuit, in accordance with various embodiments.
Figure 12:
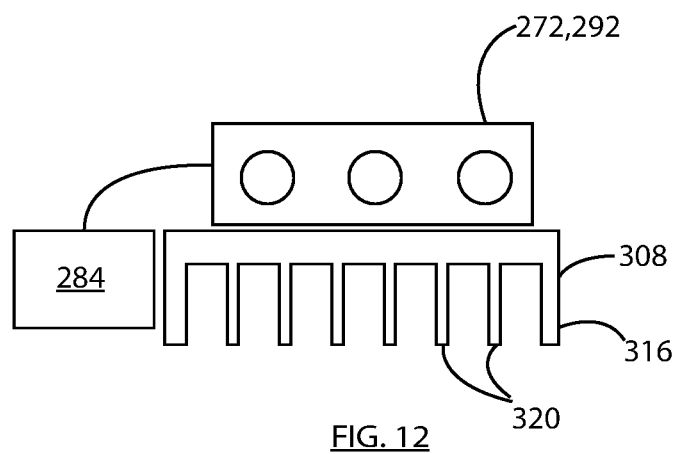
Figure 13:
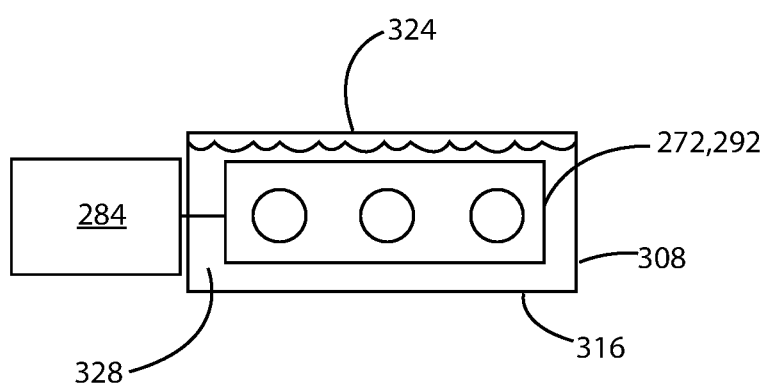

FIGS. 11-13 illustrate various embodiments of the charging circuitry 284 electrically connected to an energy storage member 272 or 292, and a thermal cooling unit 308 thermally connected to one or both of the energy storage members 272, 292 to remove heat generated during recharging and/or discharging, and thereby keep the temperature of the energy storage member 272, 292 within safe limits when the energy storage member is charged or discharged rapidly. It will be appreciated that the arrangements described herein including a thermal cooling unit 308 can be used in combination with energy storage member 272 and/or 292 in any embodiment of charging unit 280 or appliance 100 described elsewhere or illustrated in any figure.

Referring to FIG. 11, in some embodiments, thermal cooling unit 308 may include active cooling. That is, thermal cooling unit 308 may include a powered cooling element 312. An advantage of this design is that the rate of cooling can be controlled by regulating the power supplied to cooling element 312. This may provide better control over the temperature of energy storage member 272, 292. Powered cooling element 312 may be any powered device that can be operated to remove heat from energy storage member 272, 292. For example, powered cooling element 312 may be a fan as shown, a coolant circulating pump, or a Peltier cooler. As shown, the charger circuitry 284 may also include cooling control circuitry configured to control the operation of powered cooling element 312. For example, the charger circuitry 284 may control the speed of fan 312 according to the temperature of energy storage member 272, 292 and/or a heat sink thermally connected to or directly contacting energy storage member 272, 292.

Alternatively or in addition to a powered cooling element 312, thermal cooling unit 308 may include a passive cooling element 316. A passive cooling element 316 may be an unpowered device that is effective for removing heat from energy storage member 272, 292 during charging. FIG. 12 shows an example in which passive cooling element 316 is a heat sink (e.g. metal heat sink, such as an aluminum heat sink). FIG. 13 shows an example in which passive cooling element 316 is a liquid heat sink. The energy storage member may be immersed in the cooling liquid or the cooling liquid may be in a container (housing) and the energy storage member 272, 292 may be in thermal contact (e.g., abutting contact) with the container.

In some embodiments, passive cooling element 316 may be configured to provide an enlarged surface area to promote natural convective cooling with the ambient air. For example, heat sink 316 in FIG. 12 includes a plurality of cooling fins 320 that collectively provide a large surface area for convective cooling of forced convection cooling. In use, energy storage member 272, 292 is positioned in contact with heat sink 316 whereby heat from energy storage member 272, 292 in conducted into heat sink 316, and heat from heat sink 316 is lost by, e.g., convection into the ambient air.

Alternatively or in addition to promoting convective heat loss, passive cooling element 316 may have a heat capacity sufficient to absorb the heat generated by one or several charges of energy storage member 272, 292 and/or discharge of energy storage member 292 (e.g. at least 2 charge cycles, at least 3 charge cycles, or at least 4 charge cycles). For example, passive cooling element 316 may include a volume of material that after absorbing one or several charges of energy storage member 272, 292, maintains the energy storage member 272, 292 below a target temperature. In FIG. 12, heat sink 316 may be composed of a sufficient volume of metal (e.g. aluminum) to achieve this effect. In FIG. 13, thermal cooling unit 308 is shown including a housing 324 that holds energy storage member 272, 292 in thermal contact with a volume of liquid 328 (e.g. mineral oil, or other coolant). The liquid 328 may have sufficient volume to maintain the temperature of energy storage member 272, 292 within safe limits after several charging cycles.

Figure 14:
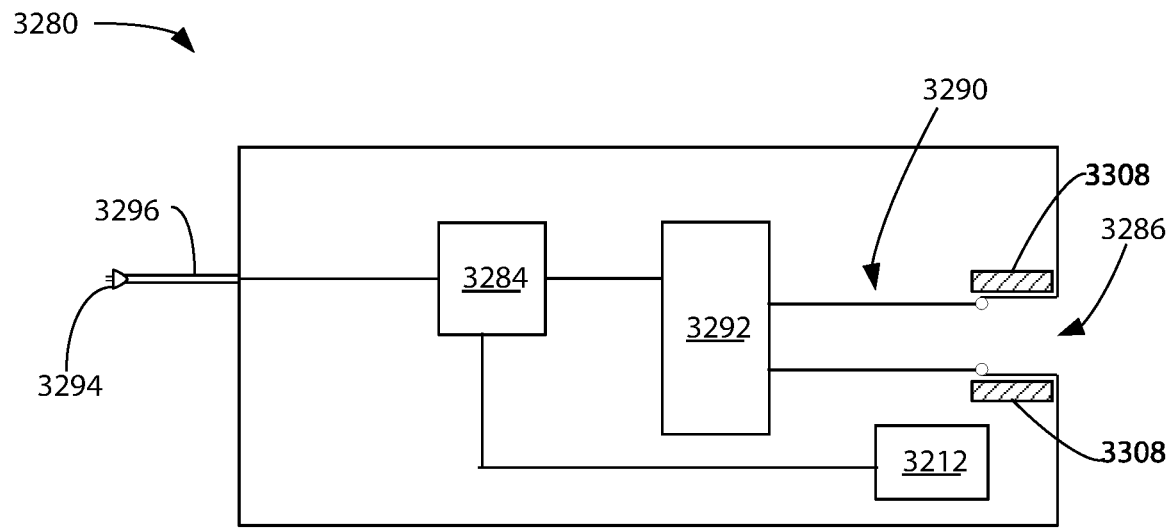

The charging unit 280 may be configured to position the thermal cooling unit 308 to contact one or both of the onboard energy storage member 292 (as shown in FIG. 14) and the appliance energy storage member 272. As shown in FIG. 14, the charging unit 280 may include a thermal cooling unit 3308 adjacent to the output port 3286 so that when appliance energy storage member 272 is inserted for charging the thermal cooling unit can absorb heat from the appliance energy storage member 272. In some embodiments, the charging unit 280 may include a thermal cooling unit 308 positioned to cool both of the appliance energy storage member 272 and the onboard energy storage member 292 concurrently during charging.

Figure 15:
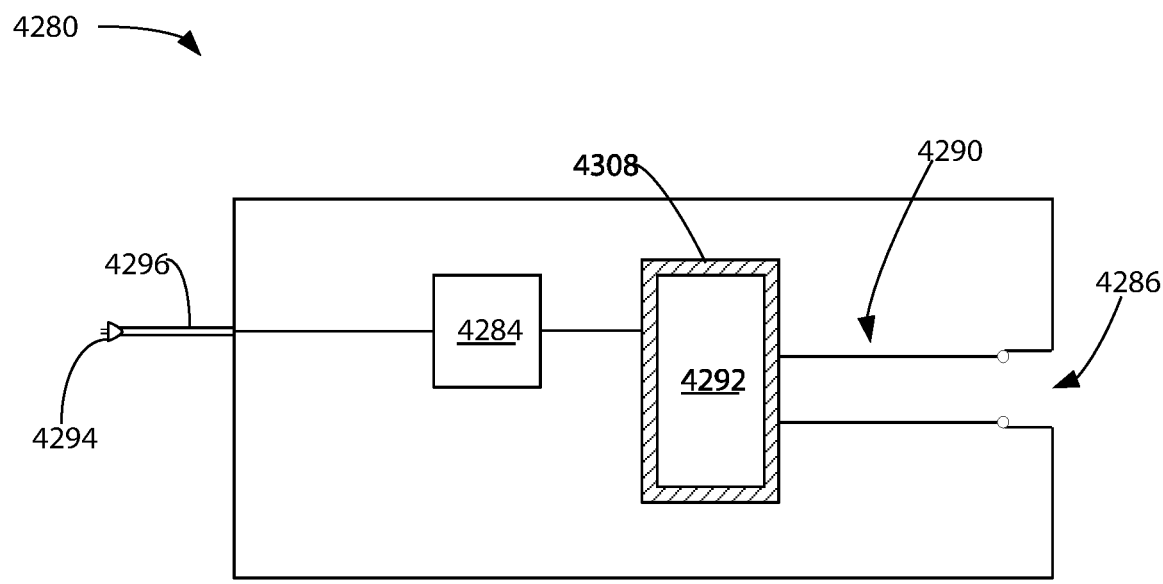

Alternately, a separate thermal cooling unit may be provided for energy storage member 272 and for energy storage member 292. For example, as exemplified in FIG. 15, a thermal cooling unit 4308 is used to cool energy storage member 4292. In the embodiment of FIG. 15, the thermal cooling unit 3308 of FIG. 14 may also be provided. It will be appreciated that the thermal cooling units may be the same or different. For example, one or both may be active or passive cooling elements.

The thermal cooling unit 308 may be integrated into the base 287 and/or sidewalls 285 of an appliance energy storage member receiving area 281. In some cases, the sidewalls 285 of the charging unit body 282 may be adapted to surround part of or to substantially surround the sides of the appliance energy storage member 272 when appliance energy storage member 272 is mounted within the receiving area. Integrating the passive cooling element 316 into the sidewalls 285 may provide an increased surface area to promote heat exchange between the appliance energy storage member 272 and passive cooling element 316. This may enable the passive cooling element 316 to absorb a greater proportion of the heat emitted from appliance energy storage member 272 during charging thereof.

As noted, additionally or alternatively, the thermal cooling unit 308 (such as a passive cooling element 316) may be configured to cool the onboard energy storage member 292. The onboard energy storage member 292 may be mounted within the base 287 of the charging unit 280. Accordingly, positioning the thermal cooling unit 308 (such as a passive cooling element 316) within base 287 may encourage cooling of the onboard energy storage member 292.

In some cases, the thermal cooling unit 308 (such as a passive cooling element 316) may be positioned within the base 287 between the receiving area 281 and the onboard energy storage member 292. The thermal cooling element 308 may thus cool both the onboard energy storage member 292 and appliance energy storage member 272 when appliance energy storage member 272 is being charged.

In some embodiments, the thermal cooling unit 308 may include multiple passive cooling elements 316 distributed throughout the charging unit body 282. For example, a first cooling element may be provided within the base 287 thermally coupled at least to the onboard energy storage member 292 while one or more secondary cooling elements are positioned within the sidewalls 285 to thermally contact an appliance energy storage member 272 positioned within receiving area 281.

While reference is made herein to cooling elements being positioned within the sidewalls 285 and/or base 287 of the charging unit body 282, it should be understood that such cooling elements may be positioned within those body components, integrated as part of the body 282, and/or mounted on interior or exterior surfaces of the body 282.

After passive cooling element 316 has absorbed the heat generated by one or more charge cycles, passive cooling element 316 will passively cool back to room temperature while charging unit 280 is not in use. Once at room temperature, passive cooling element 316 will again be capable of absorbing heat generated by a number of charge cycles. The passive cooling element 316 may cool between charging cycles (e.g. while the portable appliance is detached and in use) and/or when charging unit 280 is unused for an extended period for instance while in storage. It will be appreciated that active cooling may be used to reduce the time of a passive cooling element 316 to cool.

Portable Charging Unit with Simplified Overcharge Control

Allowing an energy storage member to be overcharged can result in damage and degradation, reducing the usable lifespan of the energy storage member. Accordingly, the charging unit may be adapted to prevent the energy storage member that is being charged from reaching an overvoltage condition. However, active feedback components that monitor the charge state of an energy storage member increase the size and cost of the charging unit. Accordingly, the charging unit can be configured to prevent an overcharge state through the configuration of the power output circuit thereby protecting the energy storage member while reducing size, complexity and manufacturing costs.

The features in this section may be used by itself in any appliance (e.g., surface cleaning apparatus) or in any combination or sub-combination with any other feature or features described herein.

Referring to FIGS. 8A-8D, the charging unit 280 can include a power output circuit 290 that is configured to reduce damage to an appliance energy storage member used with charging unit 280. In particular, the power output circuit 290 can be configured to ensure that the appliance energy storage member is not charged above a pre-defined voltage threshold.

FIG. 8A illustrates a simplified circuit schematic of the power output circuit 290 with the onboard energy storage member 292 electrically connected to the power output circuit 290. The power output circuit 290 also has a power output port 286 with output electrodes 300a and 300b to which the appliance energy storage member 272 can be connected. As shown, the power output circuit 290 also includes a load component 302 in series between the onboard energy storage member 292 and the output port 286.

FIG. 8B illustrates the power output circuit of FIG. 8A when a capacitive appliance energy storage member 276 is electrically connected to the power output port 286. The appliance energy storage member 276 is electrically connected to the power output circuit in an open circuit charging configuration. As shown in FIGS. 8C and 8D, in some embodiments the appliance energy storage member 276 may be electrically connected to the output port 286 by an electrical cord 288.

As shown in FIG. 8B, when the portable power appliance uses an ultracapacitor as the appliance energy storage member, the power output circuit 290 essentially operates as if the ultracapacitor 276 is a capacitor within the circuit. As a result, when the ultracapacitor 276 is depleted, the power output circuit 290 may see an effective short circuit through the ultracapacitor 276. When the ultracapacitor 276 is charged, the ultracapacitor effectively acts as an open circuit preventing further current flow. As a result, the maximum charge state of the ultracapacitor 276 can be limited by the voltage of the onboard energy storage member 292 that is connected to the power output circuit 290. This ultracapacitor charging configuration ensures that a pre-defined maximum charge state for the appliance energy storage member 276 can be set based on the onboard energy storage member integrated into charging unit 280. The charge endpoint for the appliance energy storage member 272 is thus defined without requiring any feedback from appliance energy storage member 272 or active control components. That is, active control and monitoring of the charge state of the appliance energy storage member 272 is not required to prevent overcharging of the ultracapacitor 276.

This configuration may simplify the control and manufacturing of the charging unit 280. For instance, charging unit 280 may omit any specific overvoltage protection circuitry for the appliance energy storage member 272.

As noted above, when the capacitor 276 is connected to power output circuit 280 in a depleted state, the power output circuit 280 may be effectively short-circuited. However, load component 302 can reduce the initial inrush current through capacitor 276. The load component 302 may be configured as a resistive or inductive load (e.g., a resistor) to ensure that the initial inrush current is minimized. This can avoid any potential damage to the capacitor that might otherwise occur due to high currents.

Optionally, the charging unit 280 may include an output display. In some embodiments, the output display can be configured to display the charge state of the onboard energy storage member 292. Additionally or alternatively, the output display can be configured to display a charge state of the appliance energy storage member 272 when the appliance energy storage member 272 is electrically connected to the power output circuit 290.

The charging circuitry 284 may include a control circuit that is operable to determine the charge state of one or both of the onboard energy storage member 292 and the appliance energy storage member 272. For instance, the charge state of the onboard energy storage member 292 may be determined by monitoring the voltage level of the onboard energy storage member 292.

The control circuitry may be configured to measure a current flow level through power output circuit 290. For example, as shown in FIG. 8D, an ammeter 304 may be positioned in the power output circuit in series with the output port 286. The ammeter 304 can be used to measure the flow of current through the appliance energy storage member 272 when the appliance energy storage member 272 is electrically connected to the appliance electrical port 286. As the charge state of the capacitor 276 increases, the resistance experienced by the power output circuit 290 will increase, and the current will correspondingly decrease. By monitoring the current through power output circuit 290, the control circuitry can determine a relative charge state of the capacitor 276. This may provide a simplified charge monitoring configuration that does not require any communication with, or feedback from, the appliance energy storage member 272.

Charging Unit Configured to Directly Power Appliance

In some embodiments, an appliance charging unit may be configured to power a portable power appliance directly, i.e., concurrently while charging the appliance energy storage member and/or the onboard energy storage member, or while not charging the appliance energy storage member and the onboard energy storage member. This may allow the charging unit to operate as a mobile power supply for the portable power appliance that has greater capacity than the appliance energy storage members. This may provide a longer operational runtime for the portable power appliance, even when away from a stationary power supply.

The features in this section may be used by itself in any appliance (e.g., surface cleaning apparatus) or in any combination or sub-combination with any other feature or features described herein.

In some embodiments, the charging units 280 and 1280 described herein above may be configured to power a portable power appliance directly, in addition to charging an appliance energy storage member and/or an onboard energy storage member.

For example, in a first mode of operation, the charging unit 280 itself can be configured to power a motor 212 directly using power from the onboard energy storage member 292. This may be desirable where the portable power appliance is being used in the proximity of the charging unit 280. This may also provide a longer operational runtime, as the onboard energy storage member 292 may have a greater storage capacity than appliance energy storage member 272.

In some embodiments, in a second mode of operation, the charging unit 280 may charge the appliance energy storage member 272 using power from the onboard energy storage member 292.

It will be appreciated that, in a further mode of operation, the charging unit 280 may charge the appliance energy storage member 272 while also powering the motor 212. This may occur where the discharge capacity of the onboard energy storage member 292 is greater than the power required to operate motor 212.

In some cases, the charging unit 280 may be preferred to operating from mains power directly, as the onboard energy storage member 292 can provide power to the portable power appliance 100 using DC current, obviating the need for separate power conversion circuitry in the appliance 100. In some cases, when the charging unit 280 is connected to mains power, the mains power may be used to charge the onboard energy storage member 292, optionally while the onboard energy storage member 292 powers the portable power appliance. When disconnected from the mains power supply, the charging unit 280 can continue to power the portable appliance directly, using power stored in onboard energy storage member 292.

In some embodiments, a user may manually select between the first mode of operation and the second mode of operation. For example, a user may toggle a switch on the portable power appliance and/or charging unit 280 to select whether the first mode or operation or second mode of operation is engaged.

In some embodiments, the charging unit may be configured to automatically select the first mode of operation or second mode of operation. For example, charging unit 1280 shown in FIG. 9 may provide separate electrical output ports 1286a and 1286b for charging the appliance energy storage member 272 and for powering the appliance 100 directly. The charging unit 2280 may detect which of the output ports 1286 has been engaged, and select the operational mode based on the connector that is detected.

In some embodiments, the appliance can include an appliance electrical cord. The appliance electrical cord may be separately connectable with each of the output ports 1286a and 1286b. The control circuitry 1284 may then select the operational mode based on the port to which the cord is connected.

In some embodiments, one of the power output ports of the charging unit 280 can define a storage member power output port 1286a. The appliance energy storage member 272 may be directly engageable with the storage member power output port 1286a. When the appliance storage member 272 is engaged with the storage member power output port 1286a, the charging unit 280 can operate in the second mode of operation to charge the appliance storage member 272.

Figure 10A:
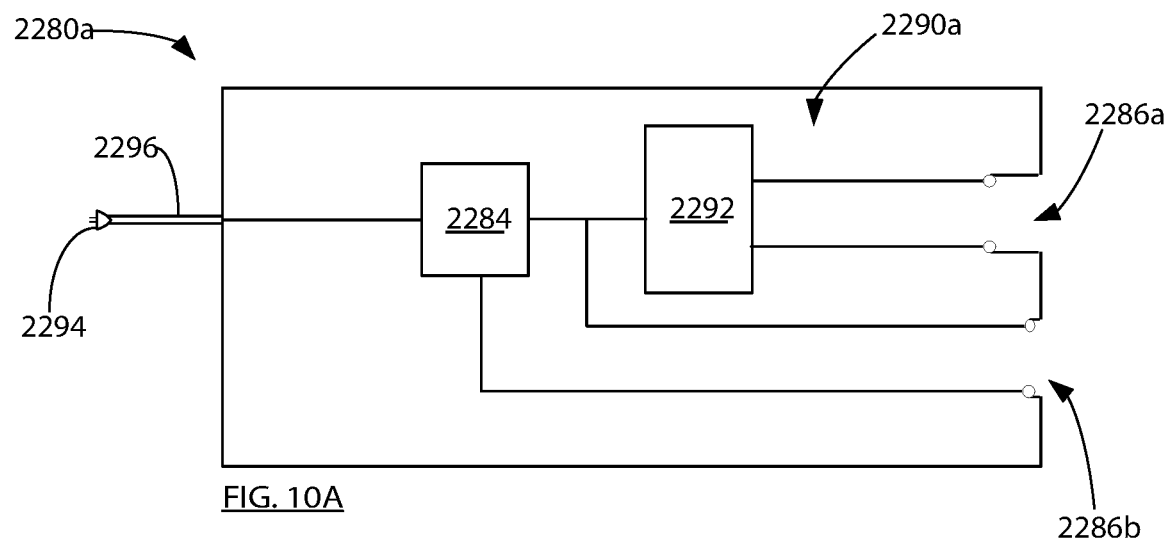
FIG. 10A is a schematic illustration of another example charging unit in accordance with an embodiment.
Figure 10B:
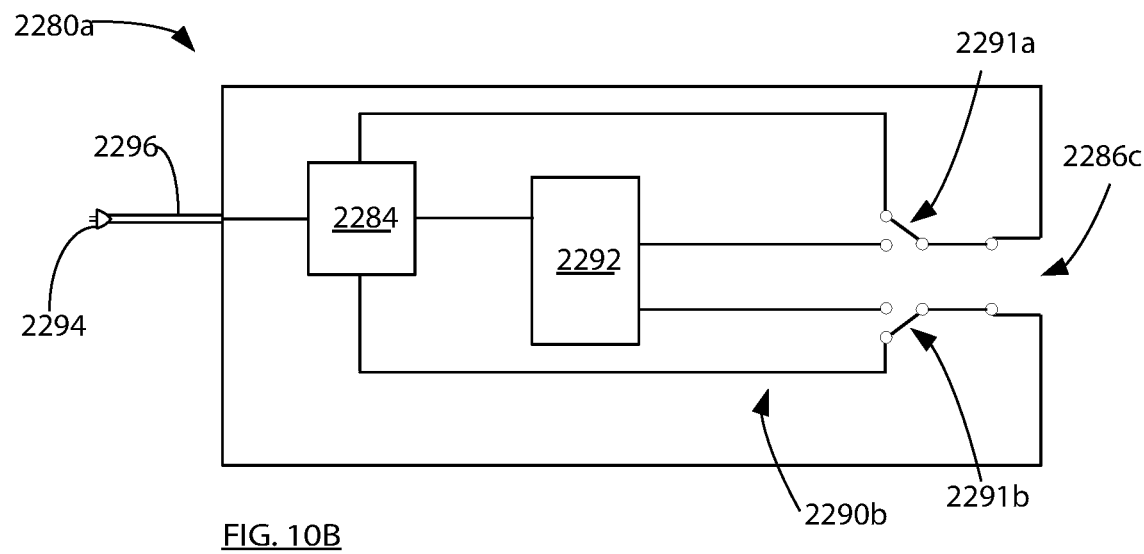
FIG. 10B is a schematic illustration of another example charging unit in accordance with an embodiment.

Reference is now made to FIGS. 10A and 10B. FIGS. 10A and 10B illustrate further examples of charging unit 2280 that can be configured to power a portable power appliance, such as appliance 100, directly. The charging unit 2280 are examples of charging unit in which power from a mains power supply can be directed to the appliance 100 (or appliance energy storage member 272), when the charging unit 2280 is connected to the power supply.

As with charging units 280 and 1280, the charging units 2280A and 2280B include an onboard energy storage member 2292, control and charging circuitry 2284, power output circuit 2290, and at least one output port 2286. The charging units 2280 also include an electrical cord 2296 and power input port 2294 that is electrically connectable to a stationary power supply such as mains power. The charging unit 2280 can be housed within a charging unit body similar to charging unit body 282.

In the example shown in FIG. 10A, the charging unit 2280A includes two separate electrical output ports 2286*a* and 2286*b*. The first output port 2286*a* is usable to connect the appliance energy storage member 272 to the onboard energy storage member 2292 (be it directly, using an electrical cord, or both). When the appliance energy storage member 272 is connected to output port 2286*a* while in situ in portable power appliance, the charging unit 2280*a* can discharge power from the onboard energy storage member 2292 to the portable power appliance.

In this configuration, the charging unit 2280A can be configured to operate in multiple modes of operation. For example, in a first mode of operation, the charging unit 2280 can be configured to power the motor 212 directly using power from the onboard energy storage member 2292. This may be desirable where the portable power appliance is being used in the proximity of the charging unit 2280A. This may also provide a longer operational runtime, as the onboard energy storage member 2292 may have a greater storage capacity than appliance energy storage member 272. In some embodiments, the charging unit 2280 may also charge the appliance energy storage member 272 while powering the motor 212.

In some cases, the charging unit 2280A may be preferred to operating from mains power directly, as the onboard energy storage member 2292 can provide power to the portable power appliance 100 using DC current, obviating the need for separate power conversion circuitry in the appliance 100. In some cases, when the charging unit 2280A is connected to mains power, the mains power may be used to charge the onboard energy storage member 2292, while the onboard energy storage member 2292 powers the portable power appliance. When disconnected from the mains power supply, the charging unit 2280 can be configured to power the portable appliance directly, using the power stored in onboard energy storage member 2292.

In a second mode of operation, the charging unit 2280 can be configured to charge the appliance energy storage member 272 using power from the onboard energy storage member 2292.

In some embodiments, a user may manually select between the first mode of operation and the second mode of operation. For example, a user may toggle a switch on the portable power appliance and/or charging unit 2280 to select whether the first mode or operation or second mode of operation is engaged.

In some embodiments, the charging unit 2280A may also be configured to operate in a third mode of operation in which power from the mains power supply is used to power the portable power appliance. For example, when the appliance charging unit is electrically connected to the mains power supply, the power output circuit 2290 may be configured to direct power from the mains power supply to the portable power appliance 100.

In the example shown in FIG. 10A, the charging unit 2280A includes a separate output port 2286*b* into which the portable power appliance 100 can be connected to allow mains power to be directed to the portable power appliance 100.

In some embodiments, the charging unit 2280A may provide power from the stationary power supply directly to the portable power appliance 100. However, the portable power appliance 100 may typically operate using direct current, while the mains supply is provided as alternating current. In some cases, the appliance 100 may incorporate power conversion circuitry. However, this increases the size and weight of appliance 100. Accordingly, the charging unit 2280A can be configured to operate as a power conversion unit for appliance 100.

The charging unit 2280A can receive the mains power supply from power input 2294. This alternating current can then be rectified (and possibly voltage regulated) using control circuitry 2284 to provide the appliance 100 with direct current via output port 2286*b*. This allows the appliance 100 to use mains power for a longer operational runtime, without requiring additional power conversion circuitry.

FIG. 10B illustrates an alternative configuration of a charging unit 2280*b* that can operate in multiple operational modes. Charging unit 2280*b* is similar to charging unit 2280*a*, except that a single output port 2286*c* is usable to power the appliance 100 using mains power or power from the onboard energy storage member 2292.

As shown in FIG. 10B, the power output circuit 2290*a* includes a switch unit 2291. The switch unit is operable to select whether the output port 2286*c* is connected to onboard energy storage member 2292 or to control circuitry 2284. In some embodiments, the switch unit 2291 may operate automatically e.g. depending on whether charging unit 2280*b* is connected to a stationary power source. Alternatively, the charging unit 2280*b* may include a switch actuator that a user can manual operate to switch between mains power and the onboard energy storage member 292.

The charging unit 2280*b* can be configured to operate in a number of different operational modes. In a first mode of operation, the charging unit 2280 can be configured to power the motor 212 directly using power from the onboard energy storage member 2292. In some embodiments, the charging unit 2280*b* may be operable in this first mode of operation when connected to, and when disconnected from, a stationary power supply.

In a second mode of operation, the charging unit 2280*b* can be configured to charge the appliance energy storage member 272 using power from the onboard energy storage member 2292. Again, this mode of operation may be engaged when charging unit 2280*b* is connected to, and when disconnected from, a stationary power supply. In some cases, toggling between the first mode of operation and the second mode of operation may occur in response to a user activating or deactivating the appliance 100.

In a third mode of operation, when charging unit 2280*b* is connected to a stationary power supply, the charging unit 2280*b* can be configured to use power from the stationary power supply to power the appliance 100 directly. As noted above, the charging circuitry 2284 may include power conversion circuitry usable to convert the received power into DC power usable by the appliance 100.

In a fourth mode of operation, when charging unit 2280*b* is connected to a stationary power supply, the charging unit 2280*b* can be configured to use power from the stationary power supply to charge the appliance energy storage member 272. In such embodiments, the charging circuitry 2284 may again include power conversion circuitry usable to convert the received power into DC power usable to charge the appliance energy storage member 272. In some cases, toggling between the third mode of operation and the fourth mode of operation may occur in response to a user activating or deactivating the appliance 100.

In some cases, the charging unit 2280*b* may also charge the onboard energy storage member 2292 concurrently while operating in the third or fourth mode of operation. The charging circuitry 2284 can be configured to route any additional power from the stationary power supply to charge the onboard energy storage member 2292.

Although embodiments of a charging unit and associated portable power appliance are described herein below in the context of a portable surface cleaning apparatus, it should be understood that various other portable appliances may be used in the embodiments described herein.

An example of a portable power appliance having an appliance energy storage member may include an electronic cigarette that is connectable to a charging unit such as described herein above. Such as charging unit may be electrically connected to a stationary power supply such as mains power and/or a vehicle electrical outlet.

Further examples of portable power appliance also include various power tools such as drills, drivers, tire inflators, dremels and the like.

A battery pack usable with one or more power appliances may incorporate an appliance energy storage member as described herein above. A battery pack for electronic appliances, such as laptops or cell phones may also be configured as described herein above. Similarly, appliance energy storage members for children's toys, portable electronics (such as radios, testing requirement and meters), and game console controllers may also be used.

Various kitchen appliances such as mixers, electric peelers, electric knives, rotary pot or pan scrubbers, temperature controlled containers (e.g. lunchboxes) may also be used in embodiments described herein.

Various portable culinary appliances may also be used, such as portable hot water systems, heated food containers, "Low Charcoal Use" BBQs, portable cooking ovens or stoves and the like.

Various personal portable power appliances may also be used in embodiments described herein to facilitate rapid recharging, such as flashlights, personals fans, coolers (e.g. direct or indirect evaporative coolers), space heaters, shavers, curling irons, hair dryers, sexual toys and/or aids and so on.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A charging unit for a surface cleaning apparatus that includes a motor and an apparatus energy storage member, the charging unit electrically connectable to a mains power supply, the charging unit comprising:
   (a) a charger body;
   (b) an onboard energy storage member; and,
   (c) a power output circuit electrically connectable to the surface cleaning apparatus;
   wherein when the surface cleaning apparatus is connected to the power output circuit, the charging unit is operable in a first mode of operation and a second mode of operation, and
   in the first mode of operation, the charging unit is operable to charge the apparatus energy storage member using power from the onboard energy storage member, and
   in the second mode of operation, the charging unit is connected to the mains power supply and the charging unit is concurrently operable to:
      charge the onboard energy storage member using power from the mains power supply; and
      charge the apparatus energy storage member using power from the onboard energy storage member.

2. The charging unit of claim 1, wherein the charging unit comprises a power conversion circuit operable to convert power from the mains power supply into a form usable to charge the onboard energy storage member.

3. The charging unit of claim 1, wherein the power output circuit omits any power conversion or power conditioning circuitry.

4. The charging unit of claim 1, wherein the onboard energy storage member has a positive electrode and a negative electrode and when the apparatus energy storage member is electrically connected to the power output circuit, the apparatus energy storage member is connected between the positive electrode and the negative electrode of the onboard energy storage member in an open circuit charging configuration.

5. The charging unit of claim 1, wherein the power output circuit omits any overvoltage protection circuitry.

6. The charging unit of claim 1, wherein the onboard energy storage member has a positive electrode and a negative electrode, the power output circuit comprises an output circuit load, and when the apparatus energy storage member is electrically connected to the power output circuit, the apparatus energy storage member is connected in series with the output circuit load between the positive electrode and the negative electrode.

7. The charging unit of claim 6, wherein the output circuit load comprises one of a load inductor and a load resistor.

8. The charging unit of claim 1, further comprising an output display operable to display a charge state of the apparatus energy storage member when the apparatus energy storage member is electrically connected to the power output circuit.

9. The charging unit of claim 8, further comprising a control circuit operable to determine the charge state of the apparatus energy storage member by measuring a current flow level through the power output circuit when the apparatus energy storage member is electrically connected to the power output circuit.

10. A charging unit for a surface cleaning apparatus that includes a motor and an apparatus energy storage member, the charging unit electrically connectable to a mains power supply, the charging unit comprising:
   (a) a charger body;
   (b) an onboard energy storage member; and,
   (c) a power output circuit electrically connectable to the surface cleaning apparatus;
   wherein when the surface cleaning apparatus is connected to the power output circuit and the charging unit is connected to the mains power supply, the charging unit is concurrently operable to:
      charge the onboard energy storage member using power from the mains power supply; and charge the apparatus energy storage member using power from the onboard energy storage member.

11. The charging unit of claim 10, wherein the charging unit comprises a power conversion circuit operable to convert power from the mains power supply into a form usable to charge the onboard energy storage member.

12. The charging unit of claim 10, wherein the power output circuit omits any power conversion or power conditioning circuitry.

13. The charging unit of claim 10, wherein the onboard energy storage member has a positive electrode and a negative electrode and when the apparatus energy storage member is electrically connected to the power output circuit, the apparatus energy storage member is connected between the positive electrode and the negative electrode of the onboard energy storage member in an open circuit charging configuration.

14. The charging unit of claim 10, wherein the power output circuit omits any overvoltage protection circuitry.

15. The charging unit of claim 10, wherein the onboard energy storage member has a positive electrode and a negative electrode, the power output circuit comprises an output circuit load, and when the apparatus energy storage member is electrically connected to the power output circuit, the apparatus energy storage member is connected in series with the output circuit load between the positive electrode and the negative electrode.

16. The charging unit of claim 15, wherein the output circuit load comprises one of a load inductor and a load resistor.

17. The charging unit of claim 10, further comprising an output display operable to display a charge state of the apparatus energy storage member when the apparatus energy storage member is electrically connected to the power output circuit.

18. The charging unit of claim 17, further comprising a control circuit operable to determine the charge state of the apparatus energy storage member by measuring a current flow level through the power output circuit when the apparatus energy storage member is electrically connected to the power output circuit.

* * * * *